United States Patent [19]
Shoureshi

[11] Patent Number: 6,137,886
[45] Date of Patent: Oct. 24, 2000

[54] ACTIVE VIBRATION CONTROL METHOD AND APPARATUS

[75] Inventor: Rahmat A. Shoureshi, Golden, Colo.

[73] Assignee: Cooper Tire & Rubber Company, Findlay, Ohio

[21] Appl. No.: 08/276,551

[22] Filed: Jul. 18, 1994

[51] Int. Cl.$^7$ .................................................. G10K 11/16
[52] U.S. Cl. ........................ 381/71.2; 381/71.8; 381/94.9
[58] Field of Search .............................. 381/71, 73.1, 94, 381/96, 71.2, 71.8, 94.1–94.9

[56] References Cited

U.S. PATENT DOCUMENTS

| | | | |
|---|---|---|---|
| 5,237,618 | 8/1993 | Bethel | 381/71 |
| 5,245,552 | 9/1993 | Andersson et al. | 381/71 |
| 5,386,689 | 2/1995 | Bozich et al. | 381/71 |

FOREIGN PATENT DOCUMENTS

| | | | |
|---|---|---|---|
| 2222053A | 2/1990 | United Kingdom | 381/71 |

OTHER PUBLICATIONS

"The Application of Self–Tuning Control Strategies of the Active Reduction of Sound" by N.J. Doelman E J J Doppenberg pp. 121–126 1991.

*Primary Examiner*—Jerome Grant, II
*Attorney, Agent, or Firm*—Joseph G. Nauman

[57] ABSTRACT

An improved active vibration control system using feedback and pseudo-feedforward sensor inputs is provided for solving the problem of random and repetitive active vibration control and noise cancellation in a system. In a first embodiment of the invention, an artificial neural network is used for learning the dynamics of a structure and for providing output signals that follow the state variables of the structure. In one implementation of the neural network, a plurality of neurons obtain biasing inputs derived from sensor inputs, as well as inputs from the other neurons in the network. Further, each neuron obtains a feedback input from itself. Each input to a neuron is weighted using a weighting function derived on-line. The neural network supplies structure parameters and state variables to an optimal controller which derives and provides a control signal to the actuators so as to counteract vibrations and/or noise sensed in the system. In a second embodiment an optimal controller utilizing a modified generalized predictive control algorithm is used to to consider the limitations on the physical characteristics of the actuator(s), on-line, in terms of the output level and the rate of change of the output in the system. Additional embodiments wherein an optimized control signal is sent to the actuator(s) to minimize vibration incident to the structure are provided.

22 Claims, 21 Drawing Sheets

ACTIVE VIBRATION CONTROL METHOD AND APPARATUS

BACKGROUND OF THE INVENTION

1. Field of the Invention

The present invention relates to active vibration and noise control systems. More particularly, the present invention relates to the active vibration control, wherein the control signal sent to the actuator(s) is optimized, on-line.

2. Description of the Prior Art

Vibration and noise control, although an old problem, has become an increasingly important issue in recent times, especially in the industrial environment. This is mainly due to the increase in usage of machinery in virtually all aspects of our lives, especially with the recent introduction of office automation. Today, one major factor in evaluating any product is its level of vibration and noise generation. Space platforms, electronic computer equipment, high precision manufacturing machinery, portable generators, appliances, automobiles, medical equipment, etc. are all examples of structures that may experience vibration and noise generation problems.

Formerly, vibrations were controlled using passive vibration control systems. However, passive vibration control mechanisms suffer in that they are incapable of handling variable speed drive systems and random excitations, especially at low frequencies. There have been a number of active control techniques developed. Many have been adapted to compensate for the problem of noise control, while only a few have addressed the issue of vibration control.

Much of the former work in the active vibration control area can be divided into three main groups: (1) those that require a synchronizing or "synch" signal and use adaptive filtering techniques to synthesize the wave; (2) those that require direct measurement of the excitation source and may or may not use filtering to compensate for other dynamics such as the actuators; and (3) those that perform off-line design analysis and assume, erroneously in many cases, that signals and systems do not change with time.

One problem with systems requiring a synch signal is that those systems have no mechanism to compensate for non-repetitive (random) vibrations or noise sources. As to the second group above, systems which require direct measurement of the excitation (a direct feedforward signal) may not be possible or may be impractical to implement, due to the difficulty in locating a sensor at an excitation point. Further, equipment useful for direct measurement of an excitation source may potentially increase the cost of the system.

Further, one problem inherent with any system that requires off-line modeling and design is that real systems change over time, especially if inputs to the system are time varying. A system designed off-line cannot take changes in the system into account. As such, none of the above-listed approaches provides an economical, practical and efficient solution to the problem of vibrations in a system.

Additionally, many prior art systems are slow due to the time intensive calculations used to obtain a transfer function used by the controller and actuators to control or counter-act vibrations. One example of this type of prior art is U.S. Pat. No. 4,490,841 which calculates Fourier transforms when in operation.

One important point to note about the above-listed approaches to active vibration control is that, although vibration and noise cancellation is a "control" problem, the above listed methods attempt to approach the subject of active vibration control from a "signal processing" and/or "filtering" view point. Thus, these techniques may not have a guaranteed stability.

There is a need for an active vibration system that can be adapted quickly on-line to compensate for vibration, due to both random and repetitive excitations, in a system and which does not have the above-described drawbacks of the prior art. Further, there is a need for an active vibration control system which approaches the vibration control application from a "control" problem point of view.

SUMMARY OF THE INVENTION

An improved active vibration system for controlling vibrations and noise at a structure resulting from at least one excitation force acting upon the structure is provided. In at least one embodiment of the present invention the active vibration and noise control system comprises at least one sensor which produces a sensor output and at least one actuator located at the structure for imparting a reaction force to the structure. Additionally, a controller is connected between the at least one sensor and the at least one actuator, the controller including a system identifier for receiving the output from the at least one sensor and deriving a relationship representative of a relationship between the output of the sensor and the application of the reaction force of the at least one actuator; and an optimal controller connected to the system identifier to receive the derived relationship and for developing control driving signals from the relationship for driving the at least one actuator.

In one particular embodiment, the system identifier includes a neural network for learning the dynamics of the structure and for providing output signals that follow the state variables of the structure. In a first example, the optimal controller used involves Kalman filtering.

In another particular embodiment, the optimal controller receives a state matrix A, an input matrix B and a state vector $\underline{X}$ from the system identifier and uses Modified Generalized Predictive Control (MGPC) to derive said control driving signals for said at least one actuator. In a first particular example using MGPC in connection with the optimal controller, the system identifier uses least means square filtering to solve for the A and B matrices and the state vector $\underline{X}$. In another particular example, using MGPC in connection with the optimal controller, the system identifier uses recursive least means square filtering to solve for the A and B matrices and the state vector $\underline{X}$. In a further particular example, using MGPC in connection with the optimal controller, the system identifier uses a neural network to solve for the A and B matrices and the state vector $\underline{X}$.

Further objects and advantages of the present invention may be discerned by persons of ordinary skill in the art after reviewing the following written description and accompanying figures.

DESCRIPTION OF THE PREFERRED EMBODIMENT

Figure 1:
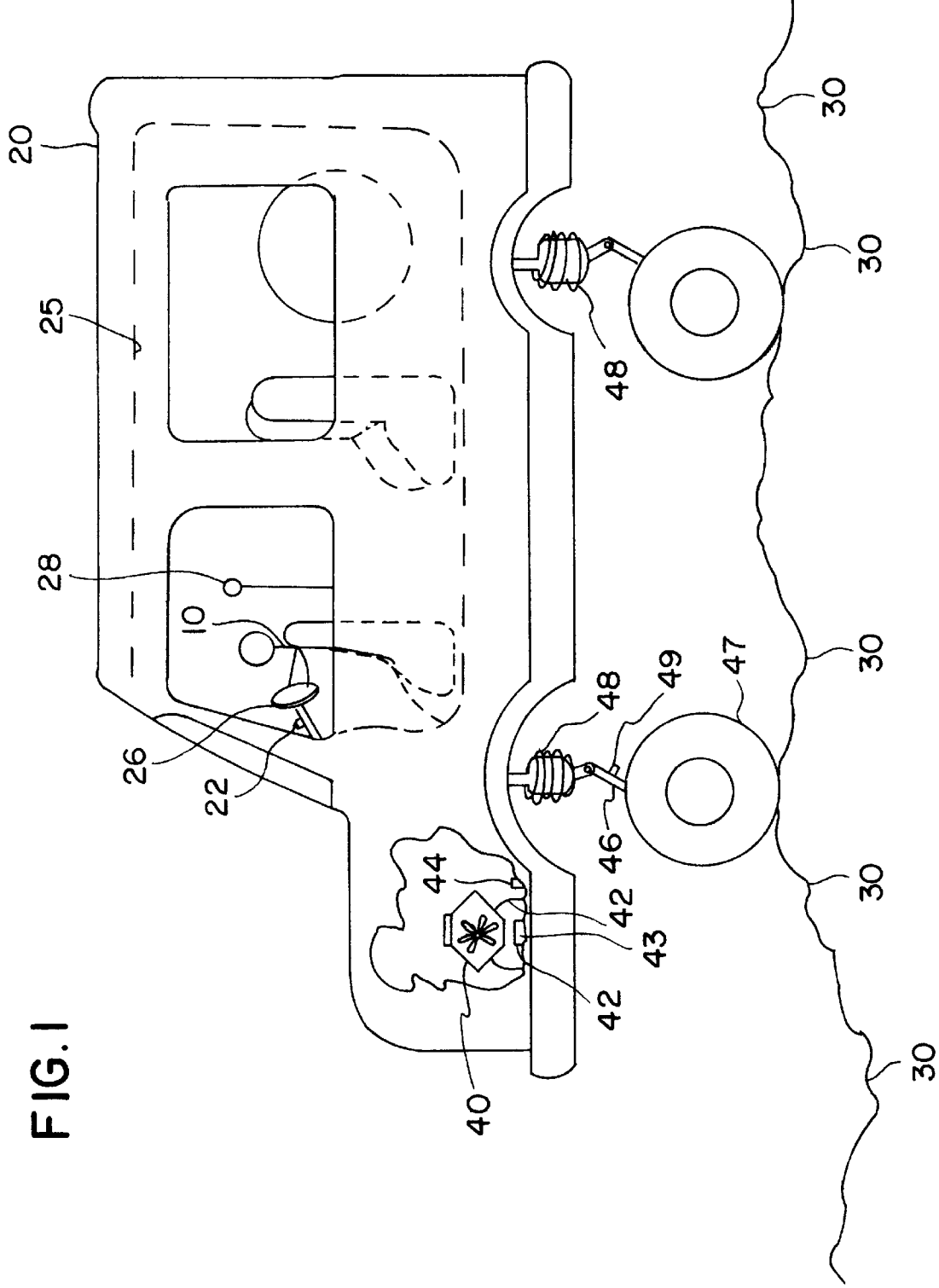
FIGS. 1–4 show examples of systems wherein vibrations from random and/or repetitive excitations are acting upon a structure, those systems incorporating the vibration control system of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
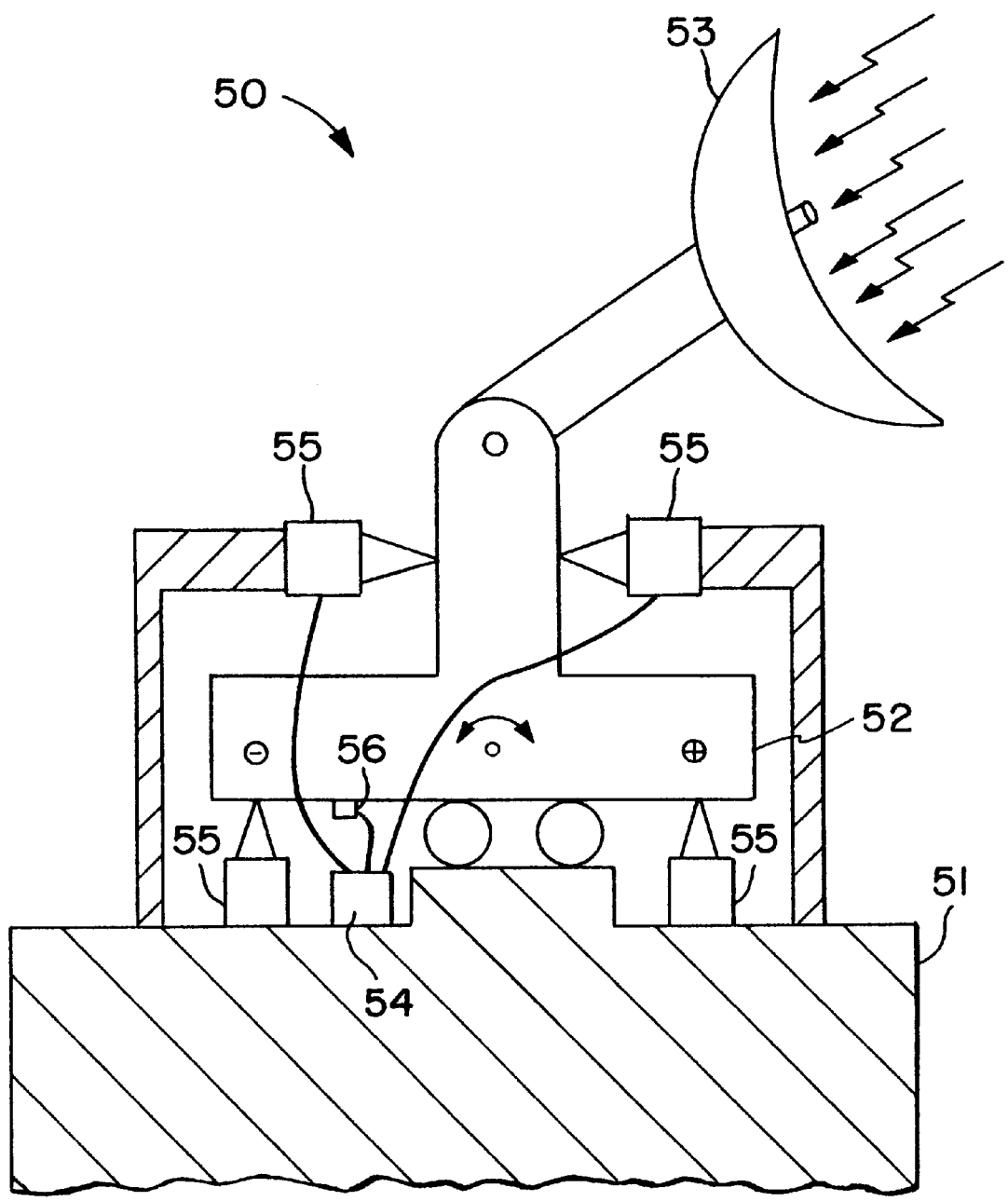
Figure 3:
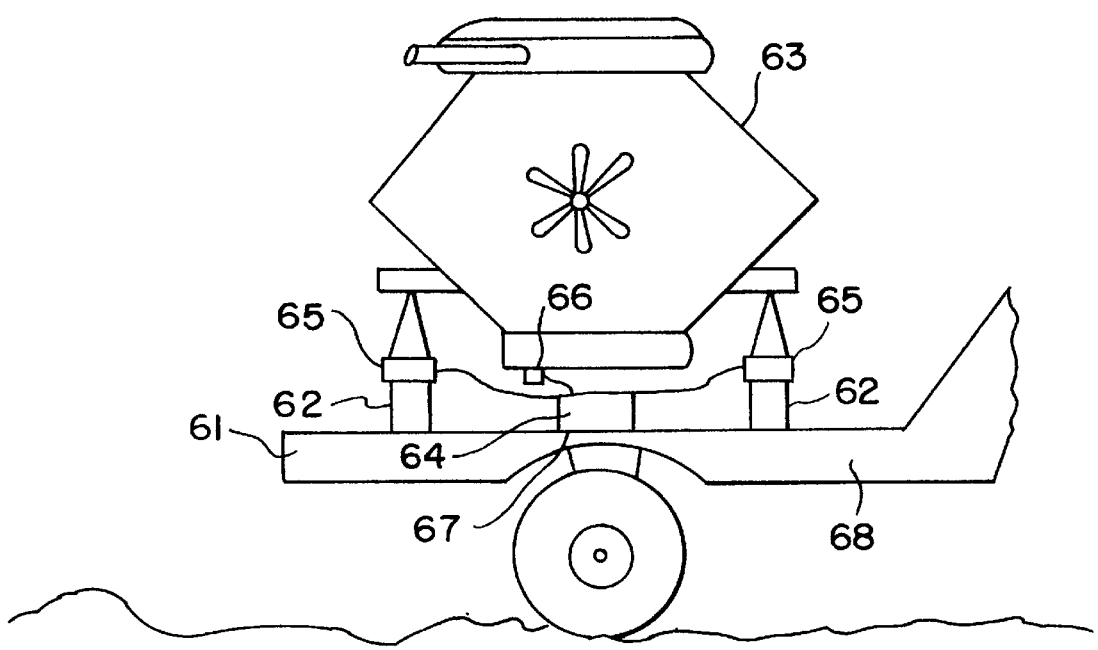
Figure 4:
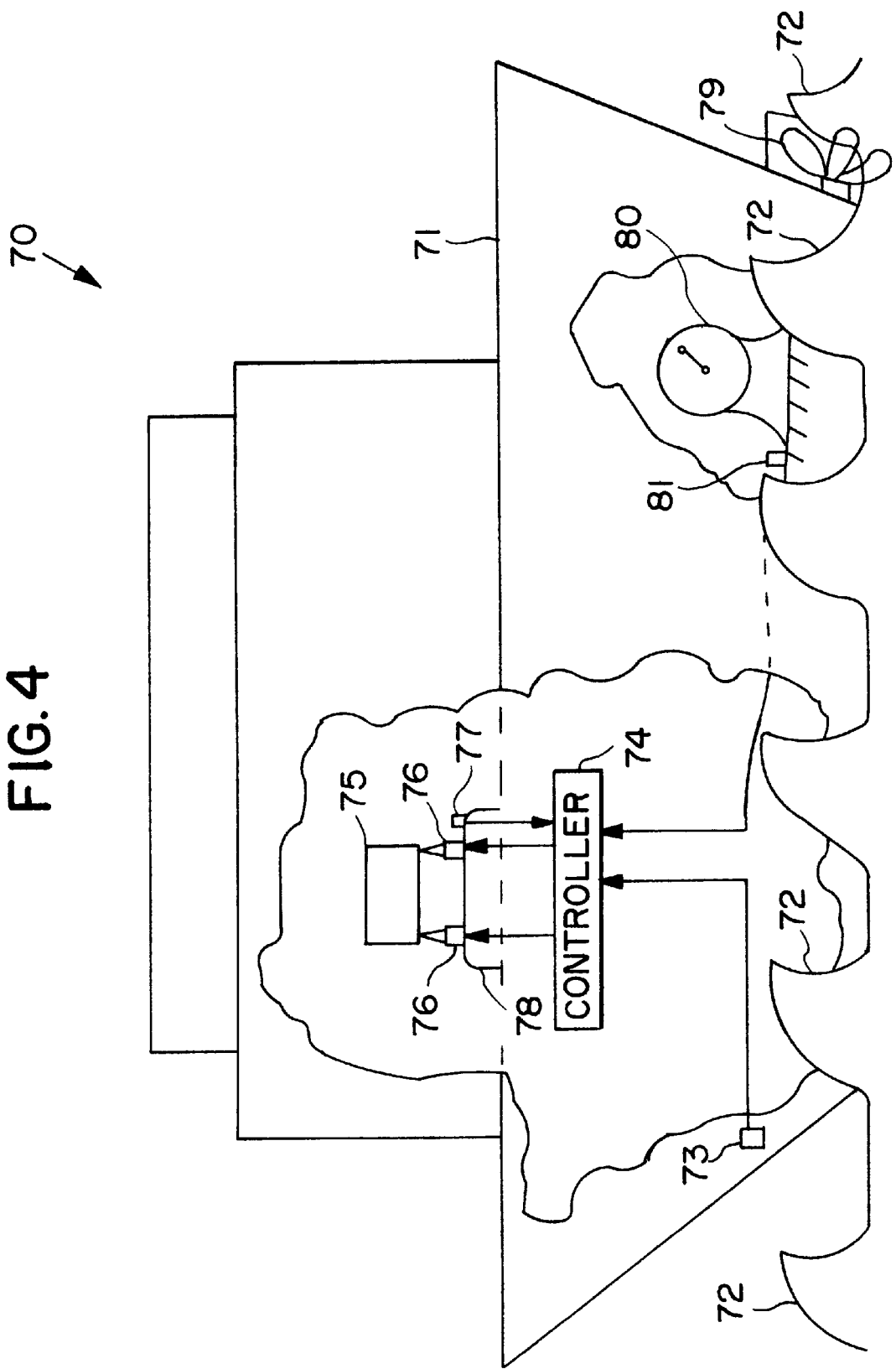

Referring now to FIGS. 1–4, there are shown various examples of systems in which vibration or noise may occur. When a vibrating body, such as the vehicle 20 of FIG. 1, the antenna 53 of FIG. 2, the engine 63 of FIG. 3, or the motor 80 of FIG. 4, is mounted on a support system by means of a mounting system, vibrations from the body are transmitted to the support system unless the mounting system is designed to either absorb the energy or counteract the vibrations.

Additionally, certain systems may have further random vibrations associated therewith, such as vibration due to road inputs 30 of FIG. 1. The use of the particular systems shown in FIGS. 1–4 are meant to be for example only. Additional systems subject to vibrations include those involving heavy machinery, sensitive computer and other electronic equipment, electric generators in an RV or on a ship or on board of an aircraft, fighter craft, or any civil structures and buildings exposed to earthquake and strong wind flows, stacks and mufflers, optical tables, medical equipment, engine-body structure of a vehicle, etc., are all examples of systems with which the present invention, as shown in the various embodiments herein, may be used.

Referring more particularly to FIG. 1, there is shown a driver 10 seated inside a vehicle 20. In operation, various vibration promoting forces are at work on vehicle 20. For example, vehicle 20 is subject to both road inputs 30, which are random vibration sources, and engine torque pulses from engine 40, which cause repetitive vibrations. Vibrations resultant from the road inputs 30 and engine torque pulses from engine 40 can be relayed to the occupants of the passenger compartment. The resultant vibrations appear to the occupant(s) as either excess vibration and/or noise.

Vehicle 20 additionally includes an active suspension system including, among other things such as shock absorbers 48, the active engine mounts 42 which support the engine 40 on the vehicle body.

Ideally, the optimal way to measure the forces acting on the vehicle 20 would be to measure road and engine excitations directly. Sensors so mounted are referred to as "direct feedforward" sensors. However, it is impractical to put sensors on the tire or within the engine. As such, a vibration sensor 22, such as an accelerometer, a force transducer, a displacement sensor, etc., is mounted on the steering column 26, and optionally, a microphone 28 is located near the driver's head area. Sensor 22 and microphone 28 are used to detect the efficacy or performance of the active vibration control system using feedback, and thus, are referred to herein as performance or feedback sensors. The performance sensors 22 and 28 relay a signal representative of the the amount of resultant vibrations detected in the passenger cabin 25 to the controller 43, which is, in turn, used to control the actuators of the active engine mounts 42. The actuators used with all embodiments of the present invention may be of any type commonly known, some examples of which are electromagnetic, hydraulic, pneumatic, piezoelectric, electromechanical (forcers or shakers), electrohydraulic, shape memory alloy, etc. Performance sensor 22 produces a signal indicative of the vibration sensed inside the passenger cabin and relays that signal to the controller 43. Microphone 28 is used to sense the amount of vibration detected in the passenger cabin 25 of the vehicle 20 which is manifested as noise.

As noted herein, it would be useful to measure incident excitations at the excitation source, so as to provide advanced information relating to the excitation (i.e. the magnitude and time of the resultant vibration). In many real systems, it is not possible to have a direct sensing of the vibration or noise source, or the source may not be identifiable as a localized excitation. However, since random excitations cannot be predicted from a simple feedback signal, then a direct source (feedforward) measurement is needed. In order to resolve the problem of obtaining such a signal, this invention develops a control scheme that operates using a "pseudo"-feedforward signal. Namely, using the example of FIG. 1, if one cannot measure road excitations 30 on the tire 47, one can measure the excitation as far in advance of the structure (or performance point) as possible, i.e., use an accelerometer 49 on the axle near the tire and use that information as a filtered (or "pseudo") version of the feedforward signal to predict the required control action before vibration due to the road input can reach the vehicle interior. Predictive measurement is possible, as the rate at which electronic transfer occurs is much faster than the rate at which vibration or acoustic waves transfer through the applicable medium.

As such, pseudo-feedforward sensors 44 and 49 have been provided to produce a filtered measurement of the excitations close to their sources. More specifically, sensor 44 is mounted near engine 40, so as to produce and supply the controller with a signal indicative of the repetitive excitations present near the engine 40. Likewise, sensor 49 is mounted on the axle 46, near the wheel 47 so as to provide a signal indicative of the randomly occurring road inputs 30, acting upon the tire 47. As such, these pseudo-feedforward sensors 44 and 49 have the ability to detect excitations prior to these excitations causing vibration and/or noise in the passenger cabin 25. The resultant signals measured by sensors 44 and 49 are referred to as filtered or structurally filtered because they are not measured at the true excitation point, but rather at a point near the excitation source, and are thus filtered by the actual structure connected between the sensor location and the excitation source. This is one example of a system using multiple pseudo-feedforward and feedback sensors. As will be seen in the examples herebelow, fewer or greater numbers of sensors and actuators may be used in accordance with the present invention.

Referring now to FIG. 2, there is illustrated an antenna 53, as a part of a stationary antenna system 50 which derives vibration control information from a performance (feedback) sensor 56. Between the antenna system base 51 and the antenna base 52, there are actuators 55 to impart vertical and horizontal forces in response to the control signals from controller 54. Controller 54 derives a response based upon input from performance sensor 56, which functions to detect the efficacy or performance of the active vibration control system using feedback. The antenna base 52 and its associated antenna 53 can thus be stabilized effectively in a fashion similar to that set forth in connection with FIG. 1.

In FIG. 3, there is illustrated an engine 63, as a part of a mobile engine system 60. Between the engine 63 and the motor mounts 62 on moveable frame 61, there are actuators 65 to impart vertical forces on opposite sides of the engine 63 in response to the control signals from controller 64. Controller 64 derives control signals based upon information from the performance sensor 66 and the pseudo-feedforward sensor 67, located on the axle of the trailer 68 upon which the engine 63 is mounted. Performance sensor 64 functions to detect the efficacy or performance of the active vibration control system using feedback, whereas pseudo-feedforward sensor 67 sends a signal representative of a future vibration due to road inputs or trailer vibration. The mobile engine system 60, thus has improved vibration control, in a similar fashion to that illustrated in connection with FIGS. 1–2 and 4.

Referring now to FIG. 4, there is shown a fourth example of a system 70 in which vibration may occur. Consider sensitive electronic equipment 75, such as electronic navigation equipment, high precision machinery, or a computer, mounted to a support system 78, and having an active vibration control system in accordance with the present invention including actuators 76, on board a ship 71. In the system 70 of FIG. 4, vibrations from several different sources are acting on the ship 71, and thus on the equipment 75 on board the ship 71. A first source of vibration may be attributed to unpredictable (random) vibrations due to the ocean waves 72 striking the ship 71. As there can be no convenient direct measurement of these random vibrations available, a vibration sensor on the ship body, such as an accelerometer, can be used to pick up a filtered version of the wave effects. Additionally, the electric motor 80, which drives the rotor or propeller 79, provides a second, predictable source of vibration which acts upon the electronic equipment 75.

In order to counter or control the amount of vibration incident on the electronic equipment 75, the filtered or "pseudo" sensed signals representative of the effect of the waves 72 and the motor 80 on the ship 71, are sent to controller 74 from the sensors 73 and 81. Again, the signals produced by sensors 73 and 81 are "pseudo"-feedforward signals, as they are used to predict the future vibratory effect of the excitation on the electrical equipment, before a resultant vibration is allowed to reach the electronic equipment 75.

Additionally, a performance or feedback sensor 77, mounted at the support 78 and connected to the controller 74, relays to the controller 74 a feedback signal indicative of the performance of the vibration control system. The signals relayed from sensors 73, 77 and 81 to the electronic controller 74 are used to predict the nature of the excitation and produce the required control signals that drive the active mounts 76 to protect the equipment 75 from the induced vibration.

Alternatively, sensor 81 may be omitted and repetitive vibrations such as are due to the motor 80 may be compensated for entirely using the feedback signal from sensor 77. Further, the signal from the sensor 77, may not only be used to predict and compensate for any repetitive excitations present in the system, it may also be used to eliminate any DC levels or leftover undesired vibrations and/or noise.

Thus, the overall preferred system configuration of this invention uses two signals: pseudo-feedforward and feedback, as shown in FIGS. 1, 3 and 4. However, it would be possible to implement the present invention using only a feedback sensor(s) as represented in FIG. 2. As stated above, the use of the examples shown in FIGS. 1–4 is not meant to be limiting. A variety of systems subject to random and/or repetitive excitations would benefit by the use of any of the embodiments of the present invention.

Figure 5:
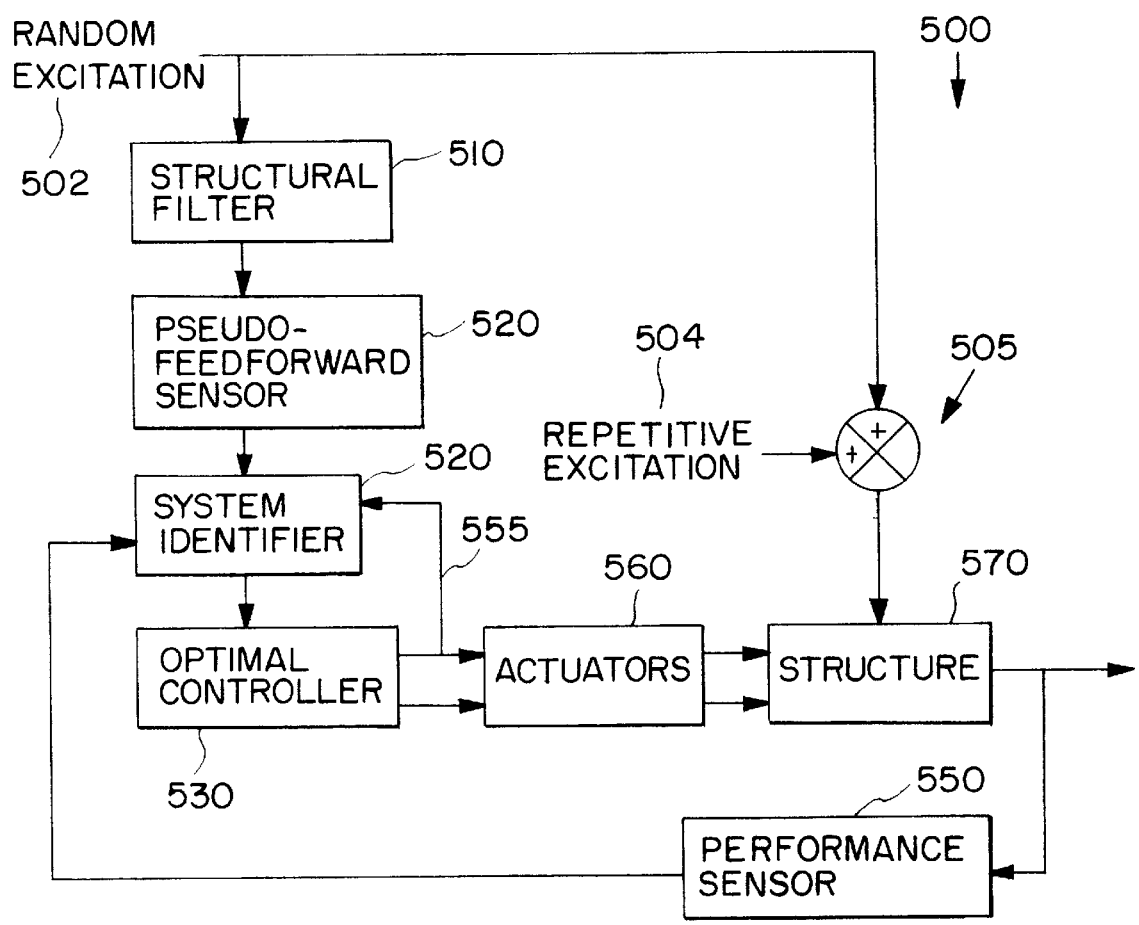
FIG. 5 is a block diagram of a first preferred embodiment of the present invention.

Referring now to FIG. 5, there is shown a block diagram of one implementation of the present invention, using a single pseudo-feedforward to detect random excitations and a single feedback sensor to report performance. This is not meant to be limiting, as in various embodiments described herein whereas multiple sensors of each type may be used. Random and repetitive vibrations, 502 and 504 respectively, add together, as represented by adder 505, and act on the structure 570, which, as noted herein, can be any structure subject to vibration and/or noise. In the example of FIG. 1 wherein a system comprised of a vehicle 20 was subjected to random road vibration and repetitive engine vibration, it was desirable to measure the random vibration as close to the excitation source as possible. This allowed for the prediction of a future vibration, prior to the actual vibration due to the excitation event being present, thus enabling the controller and actuators to counter the vibration before it reached the passenger cabin 25 of the vehicle 20.

However, as noted in connection with that example, it is impractical to place the random excitation sensor directly at the source of random excitations, i.e. in the tire, so the sensor is located as close to the source as is practical. In the vehicle example, the feedforward sensor was placed on the axle, rather than the tire, as such the actual or direct excitation was not measured. Instead, a filtered excitation was sensed at the axle, which was the result of the actual excitation on the tire. As such, FIG. 5 shows the actual random excitation 502 being filtered by the structure of the system to which the pseudo-feedforward sensor 520 is affixed, which is represented by the structural filter 510. Pseudo-feedforward sensor 520 may be an accelerometer, a piezoceramic sensor, or other type of sensor as disclosed herein. Pseudo-feedforward sensor 520 relays a signal representative of the filtered excitation to the system identifier 525. As used herein, the system identifier may be either a system learning code or system learning device, as described herebelow, or any other system that identifies the system characteristics. Additionally, a performance or feedback sensor 550, located on or near the structure 570, but away from the actuators, relays a signal which is representative of the sensed vibration present at the structure 570 to the system identifier 525. The object of the system identifier 525 is to derive a relationship (i.e. a mapping function) between the signals obtained from the performance and pseudo-feedforward sensors 520 and 550, and the application of the actuator inputs, control signals representative of which may be relayed to the system identifier 525 from the optimal controller 530 via feedback path 555. Alternatively, information relating to the actuator output may be obtained in other ways, for example, by direct sampling of the control driving signals using a sensor located at the actuator. The relationship between the application of the actuator outputs and the sensor inputs is relayed to the optimal controller 530.

Sensors 520 and 550, as discussed herein, may be multiple sensors or may each be a single sensor. Further, although not shown specifically in FIG. 5, a sensor may be placed near a source of repetitive excitations so as to provide a pseudo-feedforward signal of that repetitive excitation source (i.e., the sensor near the engine 40 in FIG. 1).

The optimal controller 530 uses a special optimal control algorithm and optimization to develop control driving signals for all of the actuators 560. Further, as described above, a feedback loop 555 provides a feedback signal from the optimal controller to the system identifier, for use by the system. The actuators 560 create the reaction or cancelling forces and apply them to the structure 570. Actuators 560 may be any known type of actuator, as described herein. FIG. 5 will be discuss ed in more detail herein in connection with various embodiments of the present invention.

Figure 6:
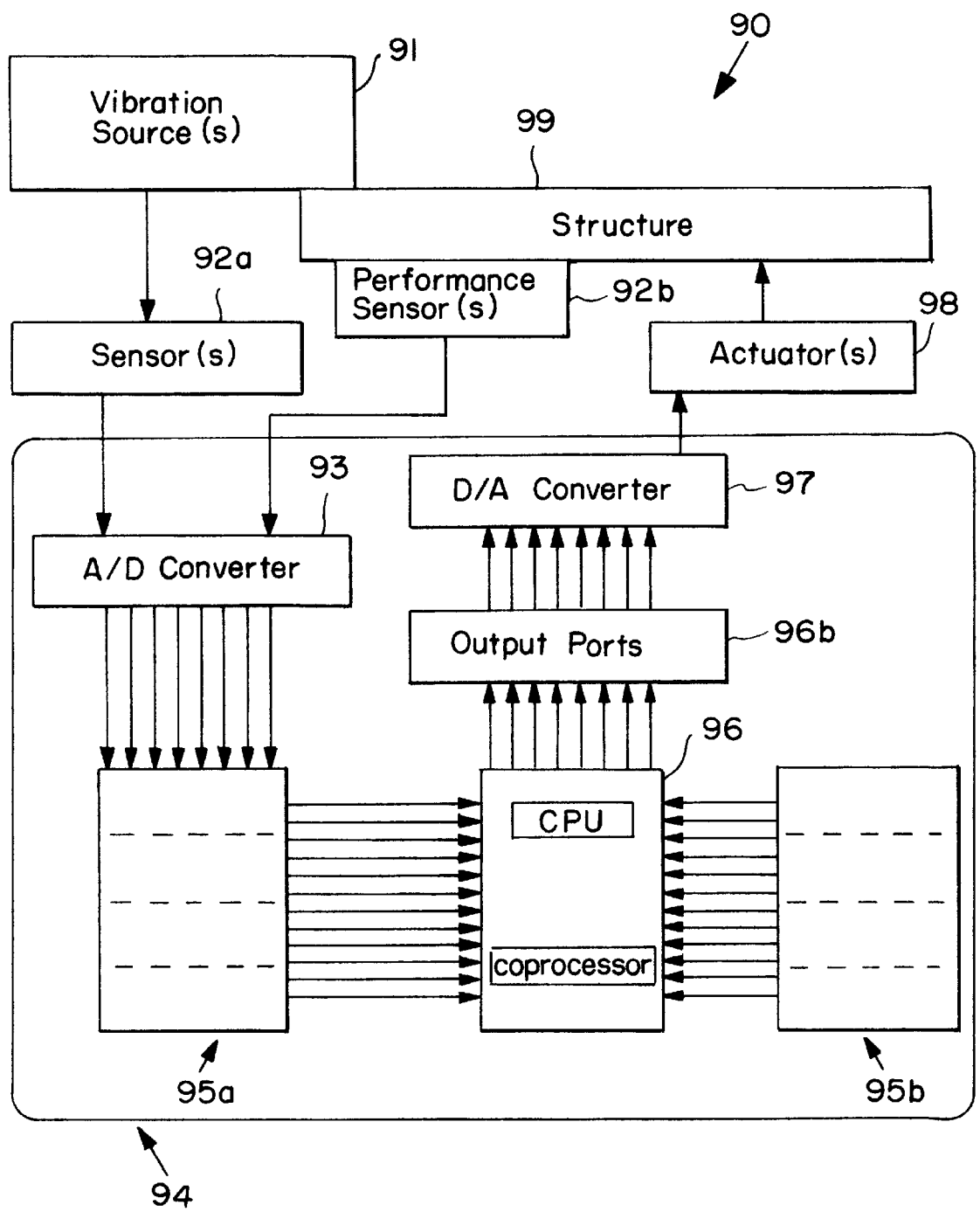
FIG. 6 shows a block diagram of a vibration control system including a microprocessor, which system is suitable for use with the present invention.

Referring now to FIG. 6, there is shown a block diagram of one possible implementation of a vibration control system 90 in accordance with the teachings of the present invention. FIG. 6 shows a system, such as the system described above in connection with FIG. 5 or herebelow in connection with FIG.7, which may be used to implement many of the embodiments of the present invention described herein subject to any modifications or substitutions described herebelow in connection with each embodiment (i.e. the implementation of the neural network using analog hardware rather than a microprocessor). The structure 99 represents the system structure which is subject to vibration from vibration source(s) 91, and upon which the active vibration system of the present invention is designed to work. The vibration source(s) 91 may be repetitive and/or random vibration sources, such as the road inputs 30 and engine 40 which act on the vehicle 20 of FIG. 1. Sensor(s) 92a represent any pseudo-feedforward sensors that may be present in the system, (examples of which may be an accelerometer, a force transducer, a tachometer, a displacement sensor, etc.) and which are located near the excitation source. Performance sensor(s) 92b represent any sensors located on or near the structure 99 to provide feedback indicative of the efficacy of the vibration control system 90.

In FIG. 6, both the system identifier (525 of FIG. 5) and the optimal controller (530 of FIG. 5) are implemented using a single controller 94, which receives the outputs of the sensors 92a and 92b. The outputs of sensors 92a and 92b are fed into an analog signal converter/conditioning module such as A/D converter 93. If the signal from the sensor(s) 92a is already provided in digital form, then the A/D converter 93 may be replaced by a filter for aliasing.

Figure 13:
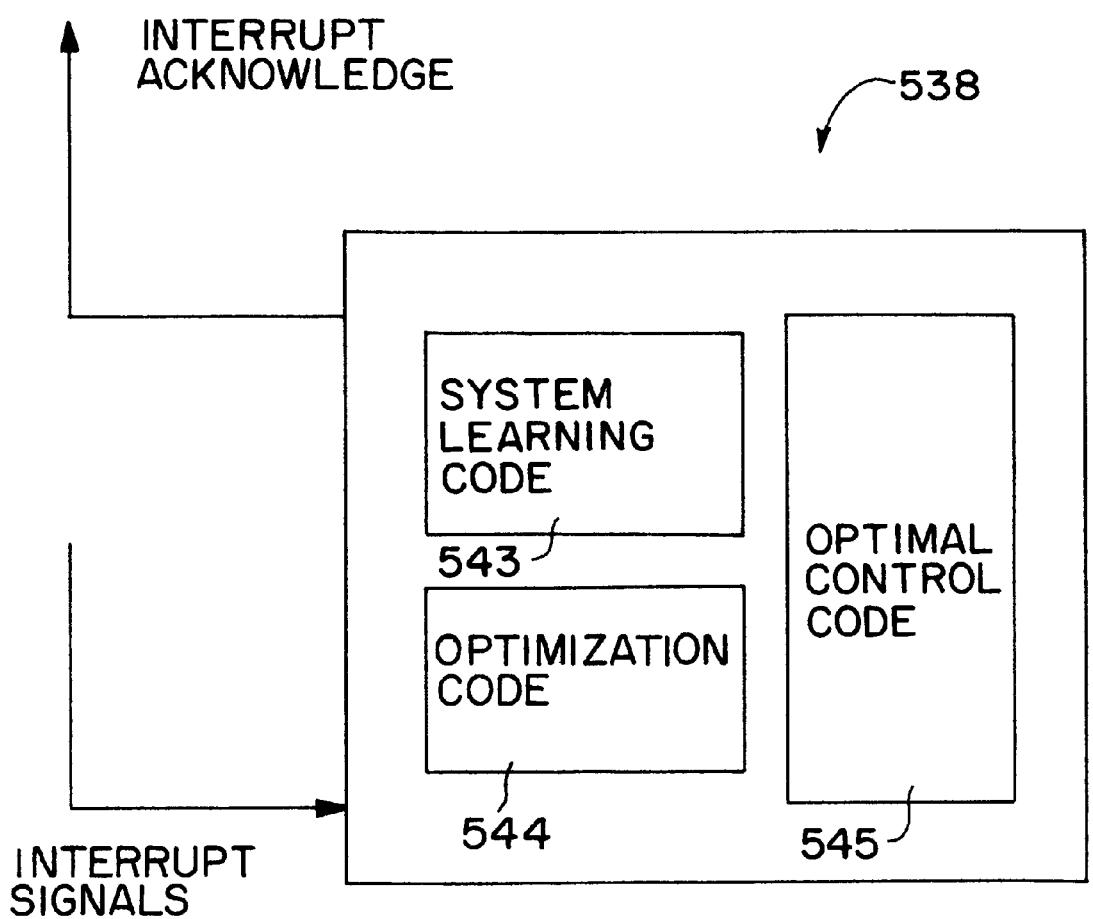
FIG. 13 is a block diagram which represents generically the ROM used in connection with the present invention, and the code stored therein which is used to implement the various embodiments of the present invention.

The resulting digital signal is fed into the random access memory or RAM 95a associated with the controller 94. The stored data is processed by the processor or CPU and co-processor 96 of the system according to algorithms stored in the read only memory or ROM section 95 of the controller 94. These algorithms stored in the ROM section include the system learning code, the optimization code, and the specialized optimal control code. These codes will be discussed with further particularity in connection with the descriptions of the various embodiments herebelow and in connection with FIGS. 13–13F.

After proper data manipulation the CPU will generate appropriate control signals, which will be converted to analog signals using the D/A converter 97 and which will be sent to the actuator(s) 98. The actuator(s) 98 act upon the structure 99 to counteract the vibrations caused by vibration source(s) 91.

Figure 7:
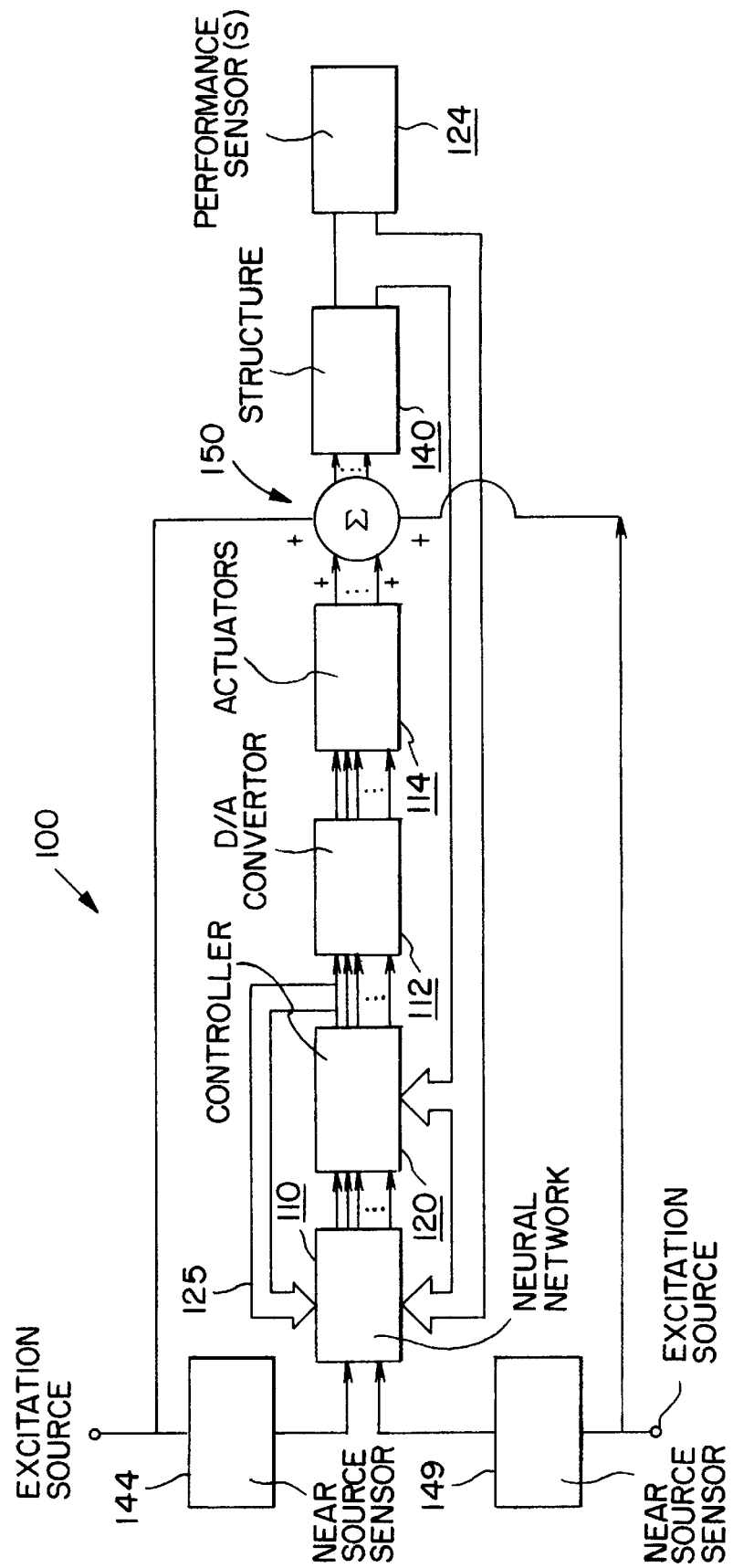
FIG. 7 is a block diagram of a first preferred embodiment of the present invention in which a neural network is used, on-line, to learn the dynamics of the system.

Referring now to FIG. 7, there is shown a block diagram of a vibration control system 100 of a preferred embodiment of the present invention. In this first described preferred embodiment, the system identifier (525 of FIG. 5) comprises an artificial neural network, which is used to process sensory information from, feedback and pseudo-feedforward sensors, so as to automatically learn on-line the dynamics of the structure, i.e., the vehicle 20, and to represent the learned dynamics in a state space form.

One area of difference between the embodiments shown in FIG. 5 and that of FIG. 7, is that multiple pseudo-feedforward sensors located near multiple excitation sources (which may be the sources of either random or repetitive vibrations) may be used. This is because one advantage to the use of a neural network is that data from multiple input sources (i.e. pseudo-feedforward and/or multiple feedback sensors) may be processed using parallel distributed processing for fast learning and adaptation. Further, multiple outputs may be produced (MIMO) from the neural network. Although, this embodiment is shown using multiple sensors, in actuality, fewer sensors may be used. For example, one or more feedback sensors may be used in systems employing a neural network without pseudo-feedforward sensors, or vice-versa.

Vibration control system 100 includes pseudo-feedforward sensors 144 and 149 (which may correspond to sensors 44 and 49 of FIG. 1) located proximal to potential excitation sources. Additionally, performance sensor(s) 124 (which may correspond to performance sensor 22 and microphone 28 of FIG. 1) are located on or near the structure 140 or the performance point of the system upon which the vibrations act.

An artificial neural network 110 receives inputs from the pseudo-feedforward sensors 144 and 149 and the performance sensor(s) 124. The neural network 110, acting to identify the system parameters, provides inputs to an optimal controller 120 which analyzes the inputs and provides control signals to the actuators 114 to counteract the sensed excitations and vibrations acting upon the system 140. Feedback path 125 (similar to feedback path 555 in FIG. 5) provides a feedback loop from the output of the optimal controller 120 to the input of the neural network 110, so as to provide additional information to the neural network 110 to aid in learning the dynamics of the system. The adder block 150 represents the summation of the vibrations due to the excitation sources and the control vibrations produced by the actuators to counteract vibration.

The signals supplied to the neural network 110 from the sensors are used to "learn" the dynamics of the structure 140 (which is, for example, vehicle, submarine, optical table, industrial machinery, etc.) and to provide output signals that exactly follow state variables of the structure 140. These variables, including performance measurements obtained by the performance sensor(s) 124, are used by the neural network 110 to perform self adjustments. Knowledge of the various states enables the optimal controller 120 to provide a true optimum amount of required actuator force to counteract the incoming vibrations to the structure.

A neural network, such as neural network 110, is composed of a plurality of neurons. A biological neuron is believed to be composed of a branching structure, comprising what are called dendrites, where the neuron is believed to pick up signals from other neurons; a cell body, called the soma; a long transmission line-like structure called the axon, and brushlike structures at the tail end of the axon called synaptic buttons. One engineering interpretation of a biological neuron which may be used with the present embodiment of the invention is shown in FIG. 8.

Figure 8:
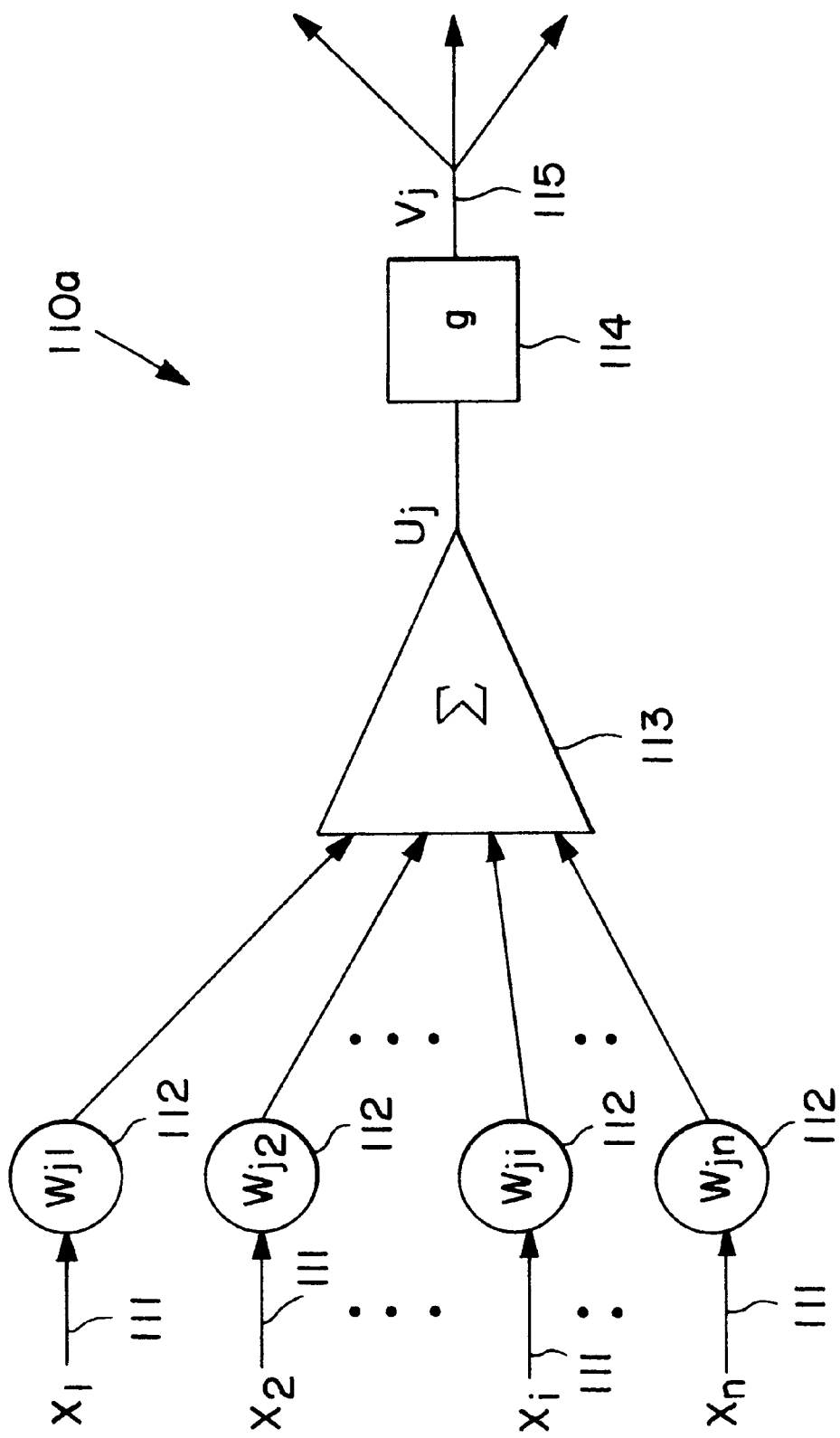
FIG. 8 is a diagram of one possible implementation of a single neuron of the neural network shown in FIG. 7.

Referring now specifically to FIG. 8, several input signals $x_1, x_2, \ldots, x_i, \ldots, x_n$, are introduced to the input channels 111 of the $j_{th}$ neuron 110a. Each individual neuron, of which neuron 110a is an example, takes each input with a different weighting function 112, $W_{ji}$, and sends the weighted inputs through a summing amplifier 113, wherein the summation, $u_j$, is sent through a nonlinear function [g] 114, typically a sigmoid function, to form the output signal, $v_j$. The output channel 115 may be branched out and used to supply an input signal to other neurons, as well as the output signal to the optimal controller 120 of FIG. 7.

Mathematically, the processing of neuron 110a may be represented as $$v_j = g(u_j)$$

wherein:

$$u_j = \sum_{k=1}^{n} W_{jk} v_k$$

When a plurality of these neurons 110a are connected together, they form a neural network, such as neural network 110.

The present preferred embodiment of the invention uses an artificial neural network to represent vibrating structures and acoustic fields. Since each mode can be mathematically described by a second order differential equation, then two neurons are used for each mode in the structure or acoustic field. The first neuron is used to represent displacement and the second neuron is used to model the velocity of that mode. Thus for a structure having n modes of vibration, 2n neurons would be used. These neurons are connected in a manner known as the Hopfield neural-network, which has been described in, among others, papers entitled "Neural Computation of Decisions in Optimization Problems," Biological Cybernetics, Vol. 52, 1985, pp. 141–152, and "Simple 'Neural' Optimization Networks: An A/D Converter, Signal Decision Circuit, and a Linear Programming Circuit," IEEE Transactions on Circuits and Systems, Vol. 33, No. 5, May 1986, pp. 533–541. Those articles are incorporated herein by reference.

Figure 9:
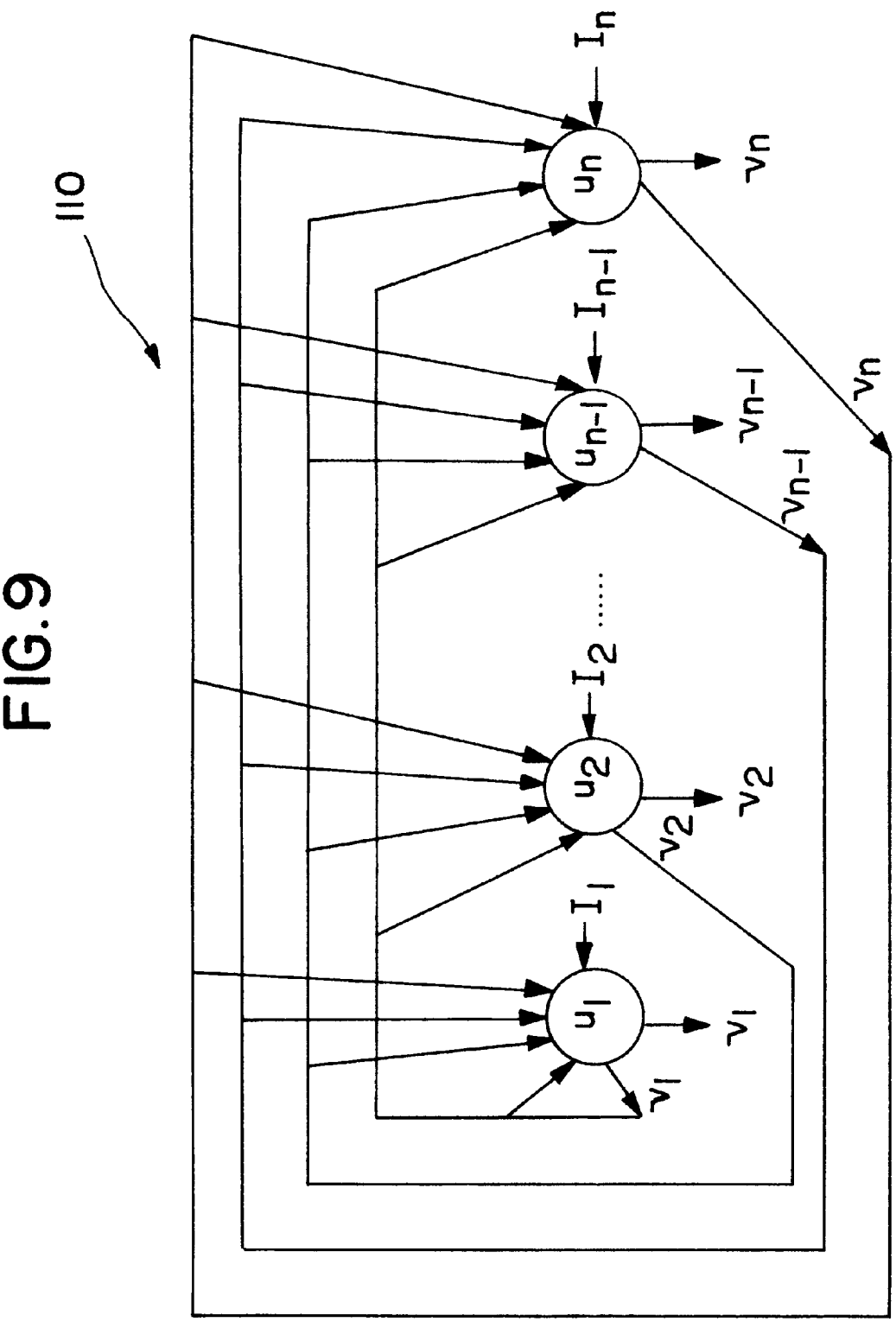
FIG. 9 is a diagram showing the interconnection of a plurality of the neurons of FIG. 8 to form the neural network of the present invention.

Referring now to FIG. 9 there is shown one such structure for a neural network 110, based upon the Hopfield model, which may be used herewith in accordance with the present preferred embodiment of the invention. To model the fact that each neuron computes a nonlinear function of a host of inputs under the influence of its own activation level, the electronic model provides a biasing current $I_i$ for each neuron. As such, FIG. 9 depicts n neurons $u_1-u_n$, each having an input bias signal $I_1-I_n$, respectively. Additionally, each neuron $u_i$ obtains an input from the output from every other neuron $u_i$ in the network 110, as well as receiving a feedback input from itself. This feedback enables the application of the Hopfield network to dynamic systems. Additionally, the output $v_i$ of each neuron is provided to the optimal controller 120. The equation of motion for each neuron's activity in continuous time for the network 110 of FIG. 9, can be written as:

$$v_i = g(u_i) \tag{1}$$

$$\frac{du_i}{dt} = \sum_{j=1}^{n} W_{ij} v_j + I_i \tag{2}$$

where $u_i$ is the activation level at the $i_{th}$ neuron, $v_j$ is the output of the $j_{th}$ neuron, and $I_i$ is a bias term for the $i_{th}$ neuron. $W_{ij}$ is the weighting for the connection between the $i_{th}$ and $j_{th}$ neuron.

Figure 10:
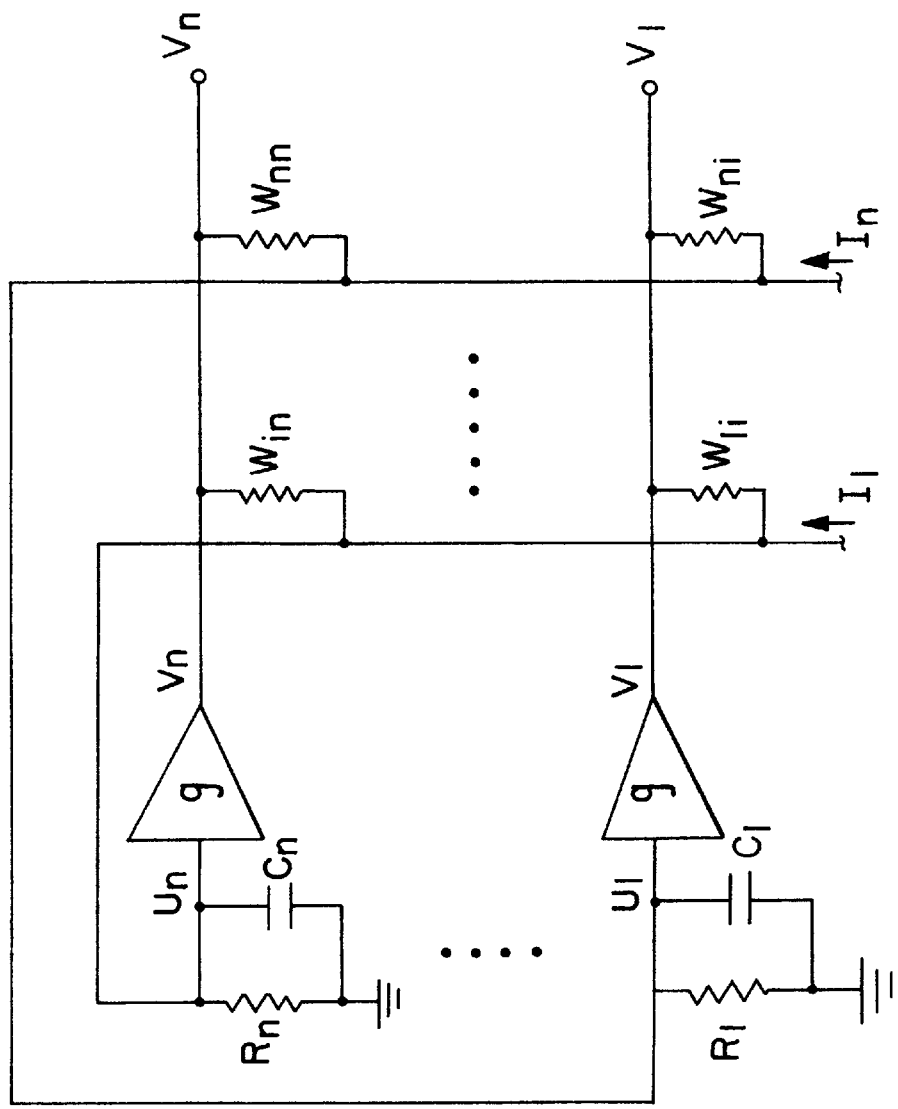
FIG. 10 is a schematic drawing of one possible hardware implementation of the neural network of the present embodiment.

Referring now to FIG. 10 there is shown one possible way in which the the network of FIG. 9 may be constructed using electronic components. Each neuron may be made of a capacitor, resistor, and a nonlinear op-amp. The connection weights may be resistors of appropriate values. The implementation of the neural network 110 using the hardware described in connection with FIG. 10 is further described in the above incorporated articles to Hopfield, et al., as well as others. Additionally, if the described neuron construction is used, an analog to digital (A/D) convertor, not shown, should be used between the neural network 110 and the optimal controller 120 of FIG. 7.

Figure 12:
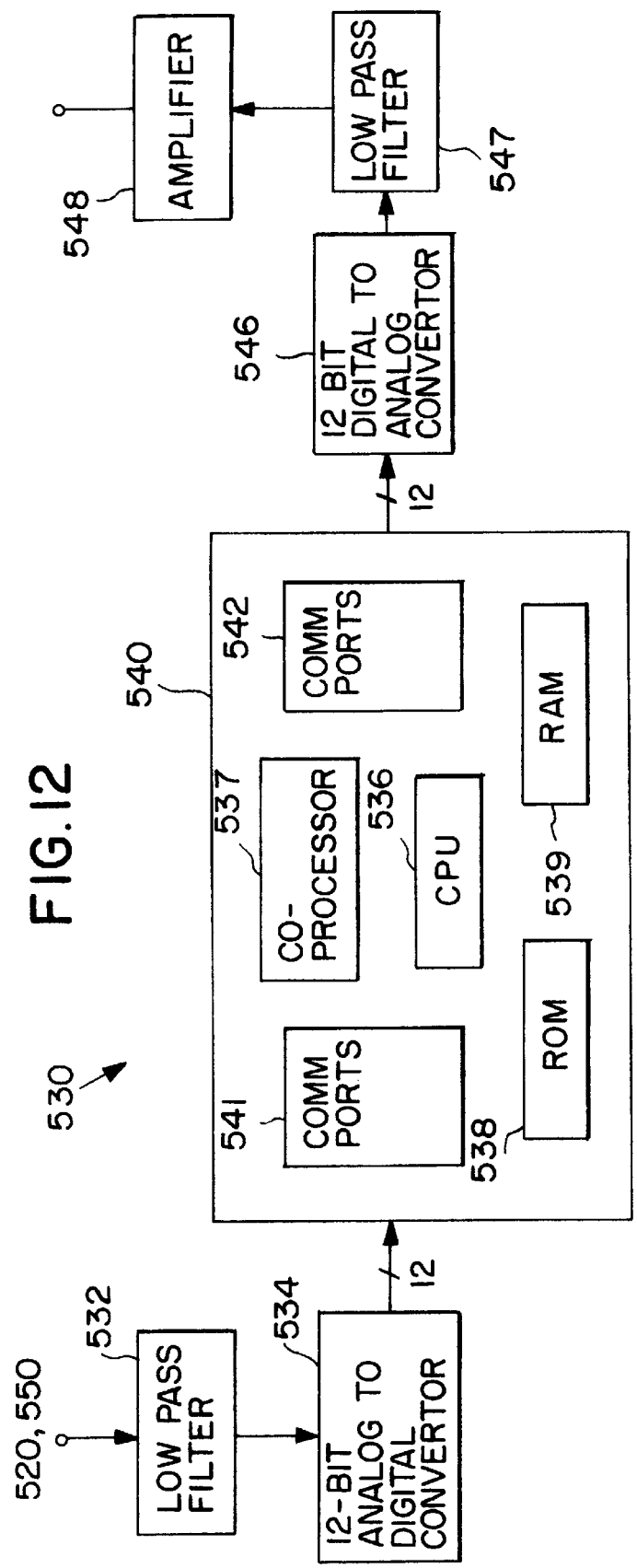
FIG. 12 is a block diagram of the circuitry which may optionally be used to implement the optimal controller of FIG. 5 and/or the neural network and controller circuitry of FIG. 7 in one preferred implementation of those embodiments.

Although the neural network 110 may be implemented using analog hardware, it is preferrably implemented by an algorithm stored in the ROM of a microprocessor, such as was discussed in connection with FIG. 6, and which will be discussed more thoroughly in connection with FIG. 12. The use of a microprocessor with on-board ROM should not be limiting as either analog hardware or a microprocessor, microcontroller, digital signal processor, or a hybrid of analog and digital etc., may be used to implement all or part of the present embodiment.

Further, in the present preferred embodiment, the microprocessor which implements the neural network 110 may additionally contain the optimal control code (as will be discussed in connection with FIGS. 13A, 13B and 13E). In which case, an A/D converter for receiving sensor inputs may be included in the circuitry leading into the microprocessor used to implement the neural network 110.

In considering the structural dynamics of the circuit of FIG. 10, consider the state space representation of the structure as:

$$\dot{X} = A\underline{X} + B\underline{V} \tag{2.3}$$

$$\underline{Y} = C\underline{X} \tag{2.4}$$

where $\underline{X}$ is a vector of the variables representing structural dynamics (e.g., modal characteristics) and V is the excitation input. Matrices A and B contain structural parameters, e.g., natural frequencies and damping ratios. $\underline{Y}$ is a vector of structure output, representing measurements at performance points, C is a matrix relating measurements and state variables. It should be noted that due to time varying characteristics of structures considered herein, the matrices A and B are assumed to be time varying.

Figure 11:
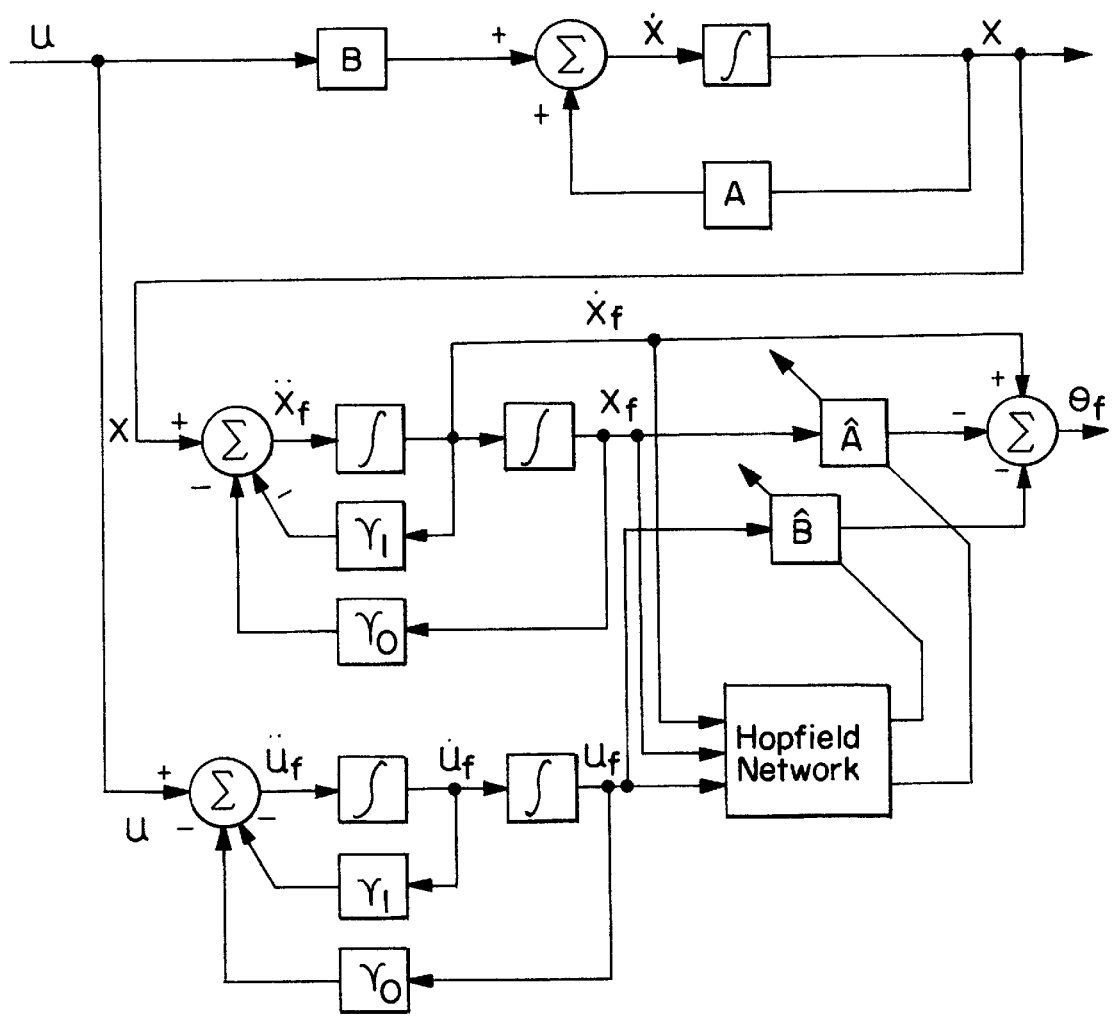
FIG. 11 is a block diagram of the implementation of the algorithm of the neural network of the present invention used to solve for the matrices A and B and derive estimates of state variables.

The neural network will be given vectors $\underline{V}$ and $\underline{Y}$, where $\underline{V}$ is the outputs of the sensors located near the excitation sources (i.e. 144 and 149 in FIG. 7) and $\underline{Y}$ is the sensor outputs from the performance sensors (124 of FIG. 7). Additionally, A(t) and B(t) must be identified in real time. Thus, the neural network 110 (FIGS. 7–10) would automatically learn system dynamics using inputs from the sensors. As such, the present embodiment of the invention may be implemented on any vibration or acoustic system, because, given sensory input, the neural network is able to "learn" the dynamics of the system, i.e. find the A and B matrices, and allow the system to automatically be tuned for the optimal active control of vibration or noise cancellation. FIG. 11 shows a block diagram implementation of this invention's neural network 110, where $\hat{A}$ and $\hat{B}$ are estimates of the A and B matrices that the network is "learning".

Figure 14:
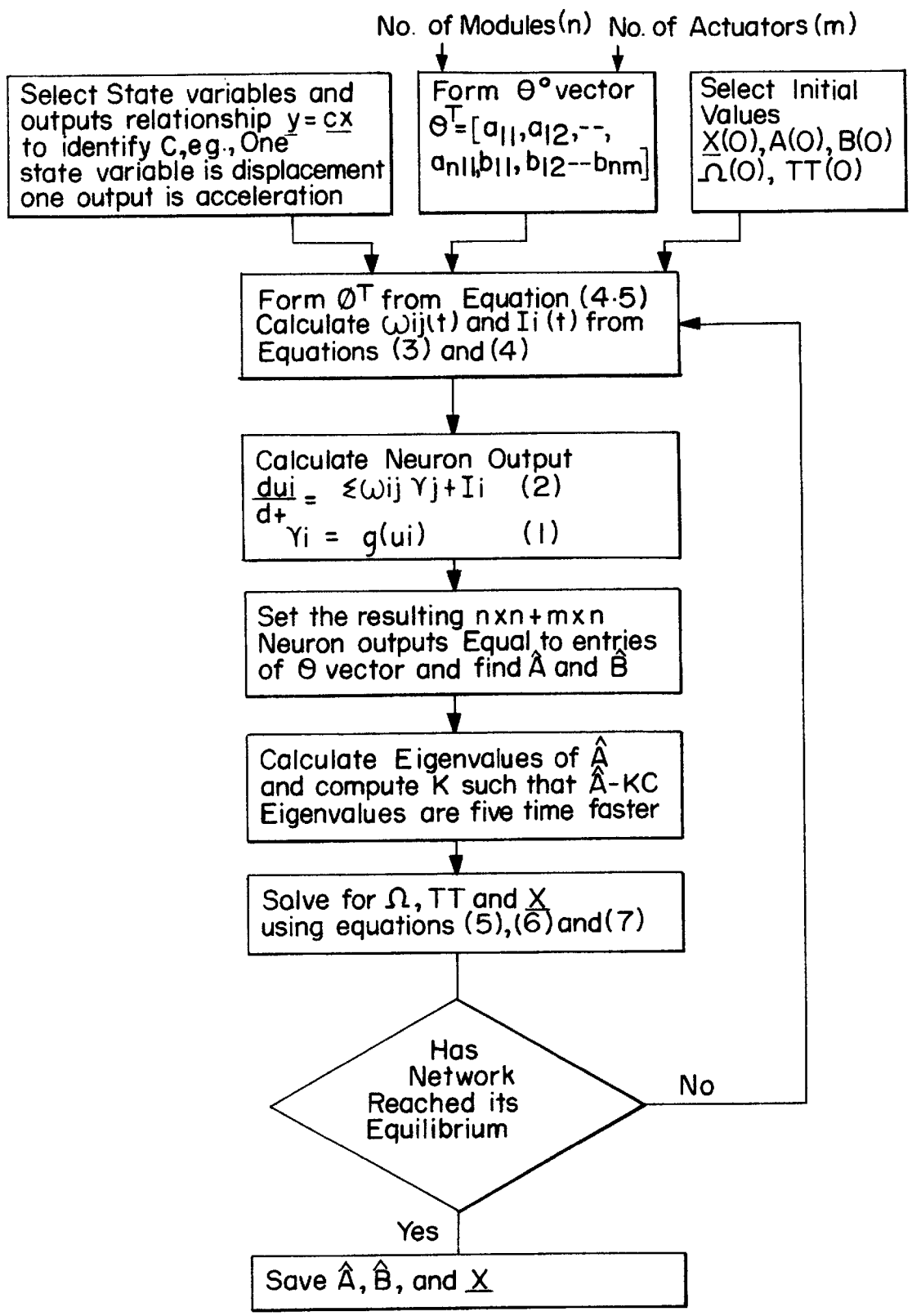
FIG. 14 is a flow diagram showing the operation of the neural network used in connection with various embodiments of the present invention.
Figure 15:
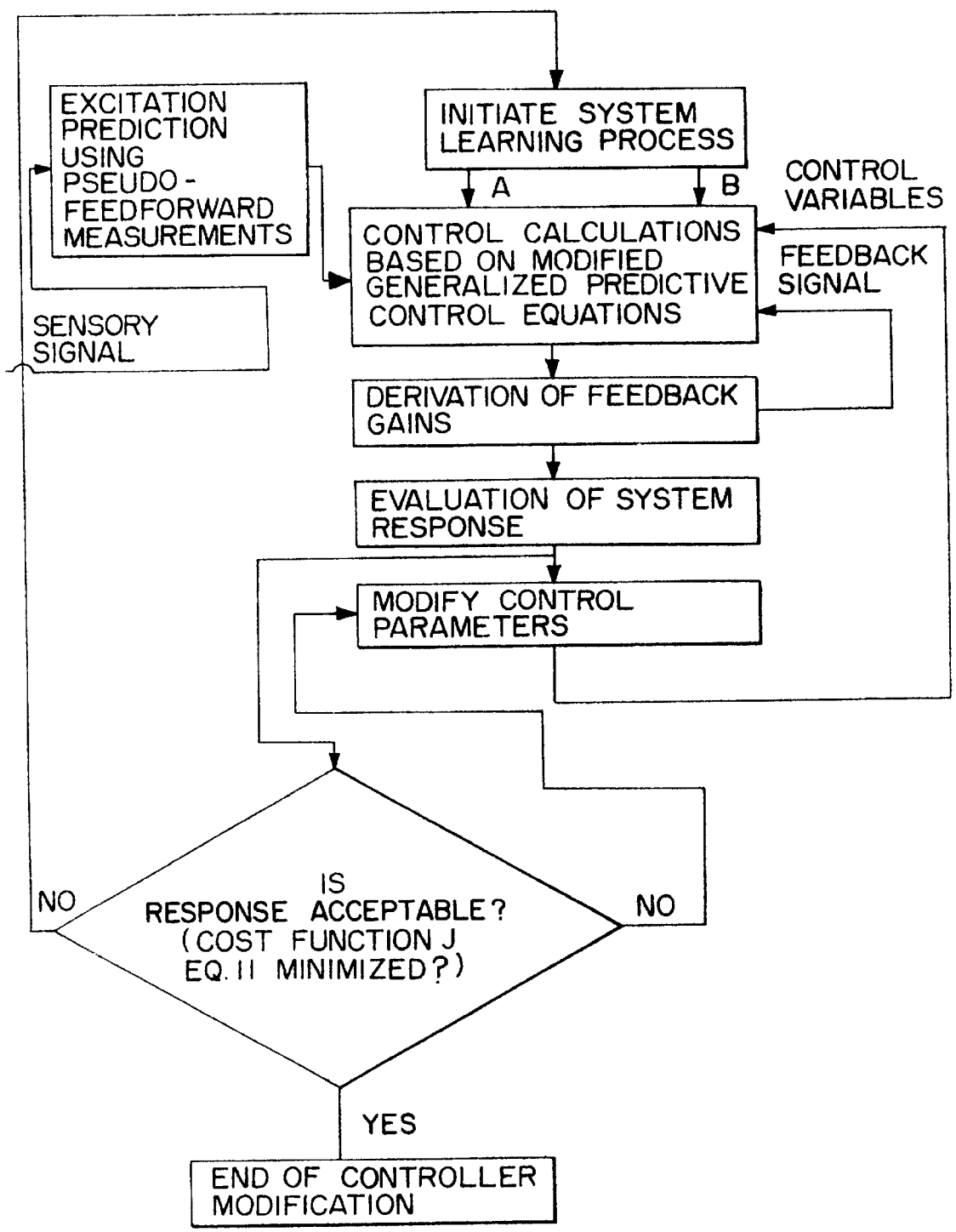
FIG. 15 is a flow diagram showing the operation of the modified generalized predictive controller for use with particular embodiments of the present invention.

As stated above, the A matrix is a state matrix, while the B matrix is the input matrix. For every element in the A and B matrices, there will exist one neuron. For example, if the structure has three modes and two control actuators are used, then A will be represented by a 6×6 matrix and B will be represented by a 6×2 matrix. Thus, the artificial neural-network implemented will have a total of 48 neurons, 36 neurons for elements of the A matrix and 12 neurons for elements of the B matrix. The connection weights ($W_{ij}$) and bias terms $I_i$ are derived on-line from the following equations.

$$W_{ij}(t) = -\left[\eta \int_o^t \phi(\xi)\phi^T(\xi)e^{-\frac{(t-\xi)}{\mu}}d\xi\right] \quad (3)$$

$$I_i(t) = -\left[\eta \int_o^t \phi(\xi)[y(\xi) - Ce^{\overline{A}\xi}x(0)]e^{-\frac{(t-\xi)}{\mu}}d\xi\right] \quad (4)$$

$$\phi^T = C[\Omega_1, \Omega_2, ---, \Omega_n, \Pi_1\Pi_2---, \Pi_m] \quad (4.5)$$

$$\dot{\Omega}_i = (\hat{A} - KC)\Omega_i + y_i I \quad (5)$$

$$\dot{\Pi}_i = (\hat{A} - KC)\Pi_i + V_i I \quad (6)$$

$$\underline{X} = \phi^T \theta + \exp(\overline{A}t)\underline{X}(0) \quad (7)$$

wherein, $\overline{A} = A - KC$, $\hat{A} \equiv$ Estimate of A; and $\hat{B} \equiv$ estimate of B.

$$\theta^T = [a_{11}, a_{12}, ---, a_{nn}, b_{11}, b_{12}, ---, b_{nm}] \quad (8)$$

$$A = \begin{bmatrix} a_{11} & a_{12} & \cdots & a_{1n} \\ a_{21} & a_{22} & \cdots & a_{2n} \\ \vdots & & & \\ a_{n1} & a_{n2} & \cdots & a_{nn} \end{bmatrix}$$

$$B = \begin{bmatrix} b_{11} & b_{12} & \cdots & b_{1m} \\ b_{21} & b_{22} & \cdots & b_{2m} \\ \vdots & & & \\ b_{n1} & b_{n2} & \cdots & b_{nm} \end{bmatrix}$$

$$I = \begin{bmatrix} 1 & 0 & \cdots & 0 \\ 0 & 1 & \cdots & 0 \\ & & \ddots & \\ 0 & 0 & \cdots & 1 \end{bmatrix} \equiv \text{identity matrix}$$

again, wherein, $W_{ji}$ represents the connection weight (strength) between neurons i and j, $u_j$ is the activation level of neuron j, $\upsilon_j$ is the output from neuron j, g( ) is a nonlinear, sigmoid, function of the neuron relating U and V. Further, m is the number of control actuators, n is the total number of state variables and $I_i$ is a bias term for a neuron. Additionally, in the above equations, A is the state matrix, B is the input matrix and C is the output matrix. Additionally, $\eta$ is the learning gain (0<$\eta$>1), $\mu$ is the filter time constant, and, I is the identity matrix and $\zeta$, $\Omega$, $\Pi$ are intermediate variables. Parameter $\mu$ is chosen based on how fast the system dynamics are, because it represents how fast the previous data or measurements should be forgotten and not to be included in the calculation of the new estimates for A, B and $\underline{X}$. FIG. 14 is a flow chart describing the operation of the neural network.

Figure 13A:
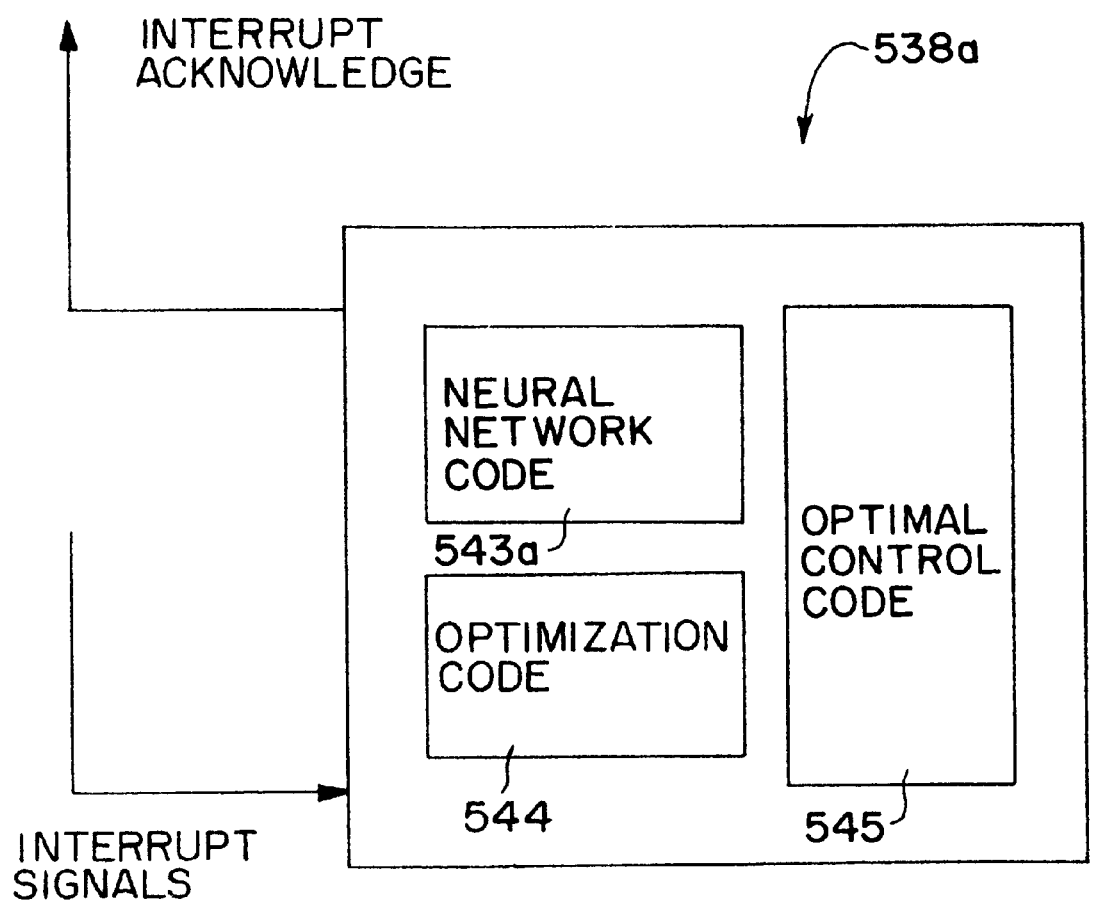
FIGS. 13A–13F are block diagrams representing generically the code stored in ROM of a microcontroller and which is used to implement various embodiments of the present invention.
Figure 13B:
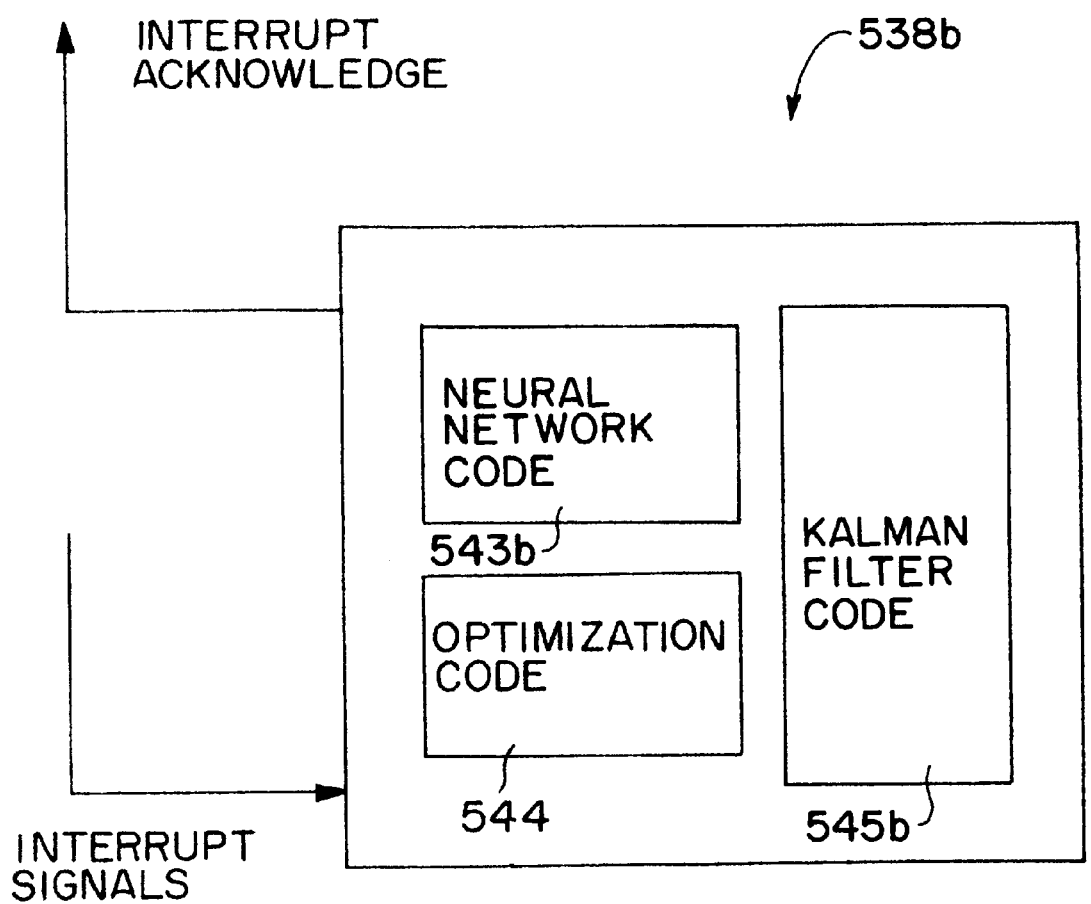
Figure 13C:
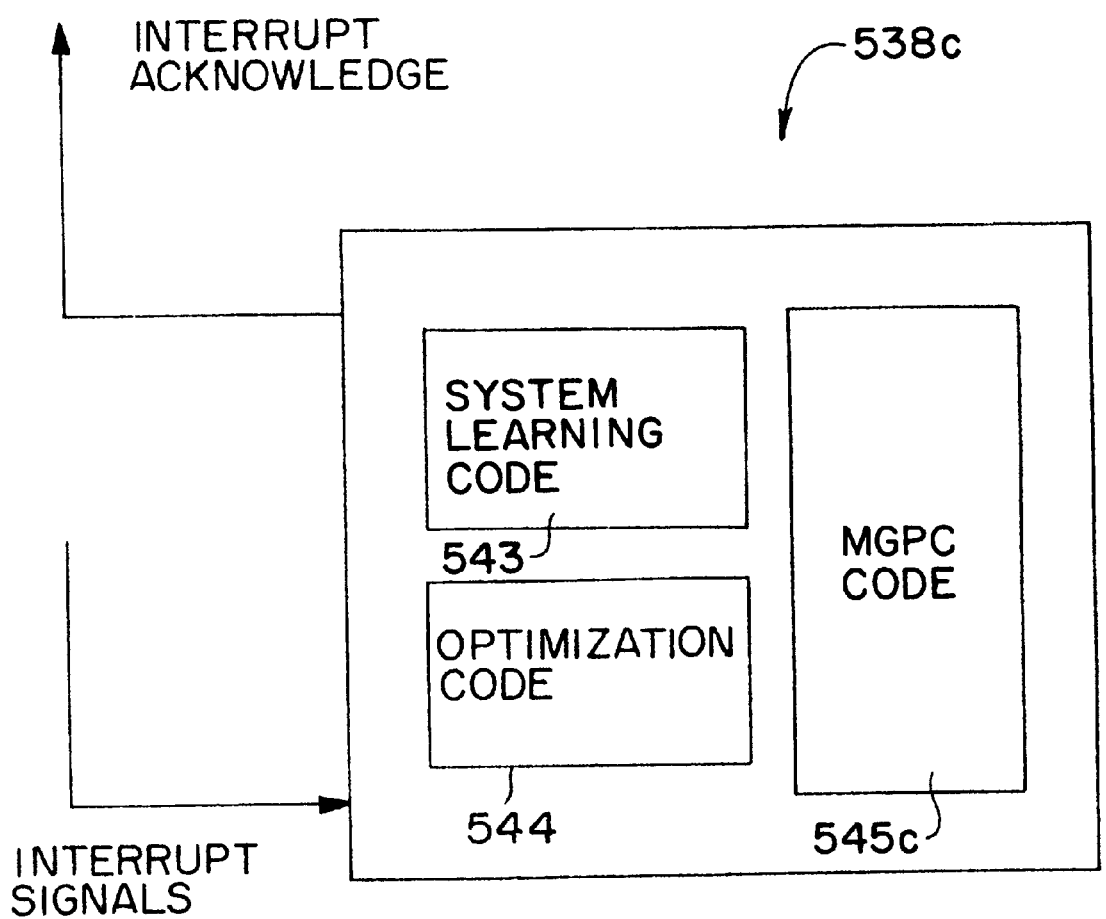

Referring back to FIG. 7, in the case having the neural network implemented in software stored in the ROM of a microprocessor, as shown in FIG. 13A, the microprocessor would receive sensory data and the control output of the previous time-step and would perform the following:

(1) activate the neural network to use input/output data and learn the system dynamics. The results of this step are the calculation of the A and B matrices, and state vector $\underline{X}$, as per FIGS. 11 and 14;

(2) use the A, B, and C matrices to calculate the optimal control signals; and (3) send the resulting control signals to the actuator(s) 114 by means of a digital to analog convertor 112.

If the neural network is implemented in hardware, then the microprocessor only performs steps (2) and (3) above and an (A/D) converter is provided between the neural network and the optimal controller to provide digitized inputs to the controller.

More specifically, if the neural network 110 is implemented using a microprocessor, then, the microprocessor used to implement this neural network 110 and the optimal controller 120 operates as follows:

(1) picks initial values for $\underline{X}(0)$, A(0) and B(0), as well as for $\Omega(0)$ and $\Pi(0)$ (these may all initially be chosen to be zero);

(2) forms the $\theta$ vector;

(3) selects the state variables and outputs according to the relationship $\underline{Y} = C\underline{X}$ to identify the C matrix;

(4) chooses the observer gain K, which is typically five to 10 times the highest frequency considered for the structural analysis;

(5) uses $\Omega$ and $\Pi$ to form the vector $\phi^T$ using equation (4.5);

(6) calculates the connection weights ($W_{ij}$) and bias term $I_i$, from equations (3) and (4);

(7) reads signals from the sensors (144, 149 and 124 in FIG. 5) to obtain $u_i$ and $Y_i$;

(8) solves equations (1) and (2) based on the results obtained in steps 6 and 7 to find the neuron output;

(9) sets the resulting n×n and m×n neuron outputs equal to the entries of the $\phi^T$ vector to find estimates for A and B;

(10) calculates the Eigenvalues of Â and computes K such that Â–KC Eigenvalues are changed;

(11) solves the first order differential equations (5) and (6) above to get Ω and Π;

(12) finds the state variables, $\underline{X}$, using equation (7) above.

(13) repeats steps 5–12 above until the network reaches equilibrium;

(14) stores A, B and $\underline{X}$

FIG. 14 is a flow diagram of the operation of the neural network 110 (FIG. 7) of the present embodiment in obtaining A, B and $\underline{X}$. Since the neural network has a unique, stable equilibrium state, the application of the method and apparatus of the present embodiment of the invention on a dynamic system, e.g., vibrating structure or acoustic field, will result in a true representation of the system.

The objective of the neural network is to provide A and B matrices as well as the state vector $\underline{X}$. Depending on the choice of states, the A matrix could directly provide natural frequencies and damping ratios of different modes.

Referring back to FIG. 7, the information obtained by the neural network 110 as explained above, will be transferred to the optimal controller 120 logic portion of a microprocessor or microcontroller. It should be noted that the neural network 110, can be used with a variety of control systems to develop control signals of different varieties for other control purposes as well as the vibration and noise control, as represented generally in FIG. 13A and more specifically in connection with FIGS. 13B and 13F described herebelow. The neural network of the present embodiment can additionally be used for failure diagnostics or estimating the state of any dynamic system or environment, as well as active vibration control. The optimal controller makes the following assumptions:

(1) that a maximum acceptable level of vibration and/or noise is provided ($Y_{imax}$); and (2) that the maximum acceptable levels for the actuator outputs, e.g., forces or sound pressures ($V_{imax}$), are provided;

Then, in one particular embodiment of the invention of FIG. 7, the optimal control code used in the optimal controller 120, may be that known as Kalman filtering. Utilizing Kalman filtering, the optimal controller minimizes the following cost function:

$$J = \frac{1}{2}\int_o^t [\underline{Y}^T P \underline{Y} + \underline{V}^T Q \underline{V}] dt$$

where P and Q are diagonal matrices that carry the terms $$\frac{1}{Y_{imax}^2}$$

and $$\frac{1}{V_{imax}^2}.$$

When J is minimized, then ratios of $$\frac{Y_i}{Y_{imax}} \text{ and } \frac{V_i}{V_{imax}}$$

are minimized.

To derive the optimal control input, $\underline{V}$, the following equations are solved:

$$\dot{R}+RA+A^TR+RBQ^{-1}B^TR-C^TPC=0 \qquad (9)$$

$$\underline{V}=-Q^{-1}B^TR\underline{X} \qquad (10)$$

Therefore, the optimal controller 120 accomplishes the following steps:

(1) based on the $\underline{V}_{max}$ and $\underline{Y}_{max}$ obtain Q and P matrices;

(2) from the sensory information regarding performance points, obtain $\underline{Y}$;

(3) from the neural network receive A, B and $\underline{X}$ (4) solve the first order differential equation given in equation (9) above using any differential equation solver subroutine, such as the known Runge-Kutta algorithm to find R;

(5) use equation (10) to derive optimal control signals to be sent to the actuators; and (6) repeat steps 2–6.

As can be seen from the above, the embodiment of the present invention shown in FIGS. 7–11 and 13A, 13B and 13E includes the intelligence, using neural-networks, to learn the dynamics and system parameters of the vibrating structure or acoustic field automatically. Additionally, as can be understood from the foregoing, the present embodiment provides for true optimal control of vibration and noise regardless of the number of sensors and actuators in the system. As such, the above described embodiment of the invention can be applied to any vibration or acoustic system without a priori knowledge of the system.

In accordance with another aspect of the present invention there is provided an improved optimal controller which considers the limitations on the physical characteristics of actuator(s) in terms of the output level and the rate of change of the output. The presently described optimal control system is described hereinbelow in connection with the model shown in FIG. 5. Note however, that it may be desirable to use the optimal control system described herebelow in place of the Kalman filtering optimal controller 120 described in connection with the active vibration control system of FIG. 7. This is because in typical applications of the optimal control using equations (9) and (10) as in the above described embodiment, the pseudo-feedforward signal is only used by the neural network to find A, B, and $\underline{X}$, and not in the optimal controller 120. However, the present optimal control system further uses the pseudo-feedforward signal in the architecture of the controller as well as in the computation of A, B, and $\underline{X}$.

The control technique used with a second embodiment of the present invention is an extension of the generalized predictive control presented by D. W. Clarke et al. in the paper "Generalized Predictive Control—Part 1 the Basic Algorithm," published in Automatica, Vol. 23, pp. 137–148, 1987, that article being incorporated herein by reference. The generalized predictive control (GPC) scheme has advantages over the use of other optimal control schemes. Whereas Kalman filtering is one optimal scheme for direct feedforward and feedback signals, GPC or the GPC, as modified herein, (MGPC) is an optimal scheme for the general case which incorporates actuator output limitations and its output rate limitations using feedback and pseudo-feedforward signals. The Kalman filters and optimal regulators (LQR) (Equations (9) and (10) above) are most useful with a structure that has feedback only. As such, the MGPC described herein is an improvement over the use of regular optimal control or Kalman filtering.

As described above generally in connection with FIGS. 1–4, both random and repetitive vibrations are known to act on certain systems. Referring back to FIGS. 5, the present system has the advantage that it may be implemented using as few as two sensors, a single pseudo-feedforward sensor and a single performance sensor. Further, the pseudo-feedforward sensor(s) may be used to measure random and/or repetitive excitations. If more sensors are added, and the above described neural network embodiment were used in connection with an optimal controller using GPC or MGPC (FIG. 13F), the job of the controller would be simplified because A, B, and $\underline{X}$ estimates may be provided faster. The actuators used may be of one or more of the types mentioned herein or known in the art.

As described above, the system identifier 525 and the optimal controller 530 may both be implemented using analog circuits, a microprocessor, microcontroller, a digital signal processor, or a hybrid of analog and digital processors in order to provide flexibility in the use of mathematical expressions and in the number of input sensor signals and output actuator signals present. In connection with the present embodiment, a microprocessor 540 is used. FIG. 12 shows a more detailed view of one implementation of a controller, such as the controller 94 of FIG. 6, including a microprocessor 540, which may be used with the present invention. The microprocessor 540 is used to process sensor inputs according to the code stored in the ROM 538 (FIG. 13). As noted above, a microprocessor 540 of the type shown in FIG. 12 could additionally be used to implement the neural network 110 and optimal controller 120 of the first embodiment (FIG. 13B), as well as with other optimal controllers (FIGS. 13A and 13B).

Signals from the sensors 520 and 550 of FIG. 5 are first passed through a low pass filter 532 (FIG. 12) to eliminate high frequency noise. Then the signal is sent through an analog to digital (A/D) converter 534. Preferably, a 12-bit A/D converter is used in the present embodiment, however, other A/D converters may be used. If the neural network of FIG. 7 is implemented using a controller as in FIG. 12 then additional sensor inputs may be provided.

The signal from the A/D converter 534 is relayed to the microprocessor 540. As with many standard microprocessors, the microprocessor 540 includes a central processing unit or CPU 536, including a clock, a math co-processor 537, on-board RAM 539 and ROM 538, which may take the form of EPROM or EEPROM. Further, communication (I/O) ports 541 and 542 are provided. As depicted in FIG. 13, codes stored in ROM 538 of the microprocessor 540 may provide for the system learning 543, optimization 544, and the optimal control algorithm 545, which in FIGS. 13C–13F is the modified generalized predictive control (MGPC) algorithm described herebelow. ROM 538 is accessed through interrupt signals from the CPU.

The system learning code 543 stored in the ROM 538, may be of many types. For example, in FIGS. 13A, 13B and 13F, the system learning code takes the form of the neural network described above. If the modified generalized predictive control system of the present embodiment is used as the optimal control in connection with a neural network, whether implemented in code (FIG. 13F) or with hardware, the following equations provide the H(S) transfer function in the continuous domain and the H(Z) transfer function in the discrete domain:

H(S)=C(SI-A)$^{-1}$B

H(Z)=C(ZI-A)$^{-1}$B

When a non-neural network system learning code or device is used in connection with the MGPC, (i.e. FIGS. 13C–13E) the following relationship is assumed between these points:

$$H(Z) = \frac{b_o + b_1 Z^{-1} + \ldots + b_n Z^{-n}}{1 + a_o Z^{-1} + \ldots + a_{n-1} Z^{-n}}$$

where n is the order of the system and can be determined a priori by an experimental modal analysis of the particular system to which the invention is applied.

In order to guarantee consistency in the system learning, the controller sends a known signal, V(t), of high modal density (e.g. a dynamically rich signal) to the actuators, then simultaneously, sensor outputs (y(t)) are obtained and synchronized input/output data streams would be stored in the RAM 539, after which, the system learning code would be called. If the system learning code is not the neural network of the first embodiment (FIGS. 13C–13E) then a recursive formulation may be used. This recursive type system learning code, could use the input/output data vectors to identify $a_i$'s and $b_i$'s of the system transfer function. The code contains the following two vectors and estimate of the output, $\hat{y}(t)$:

$\hat{\theta}^T = [\hat{a}_0, \hat{a}_1, \hat{a}_2, \text{- - -}, \hat{a}_{n-1}, \hat{b}_1, \hat{b}_2, \text{- - -}, \hat{b}_n]$ $\Phi^T(t-1) = [-y(t-1), -y(t-2), \text{- - -}, -y(t-n), V(t), V(t-1), \text{- - -}, V(t-n)]$ $\hat{y}(t) = \hat{\theta}^T * \Phi^T$ where $\hat{\theta}$ is the estimate of unknown transfer function coefficients.

Figure 13D:
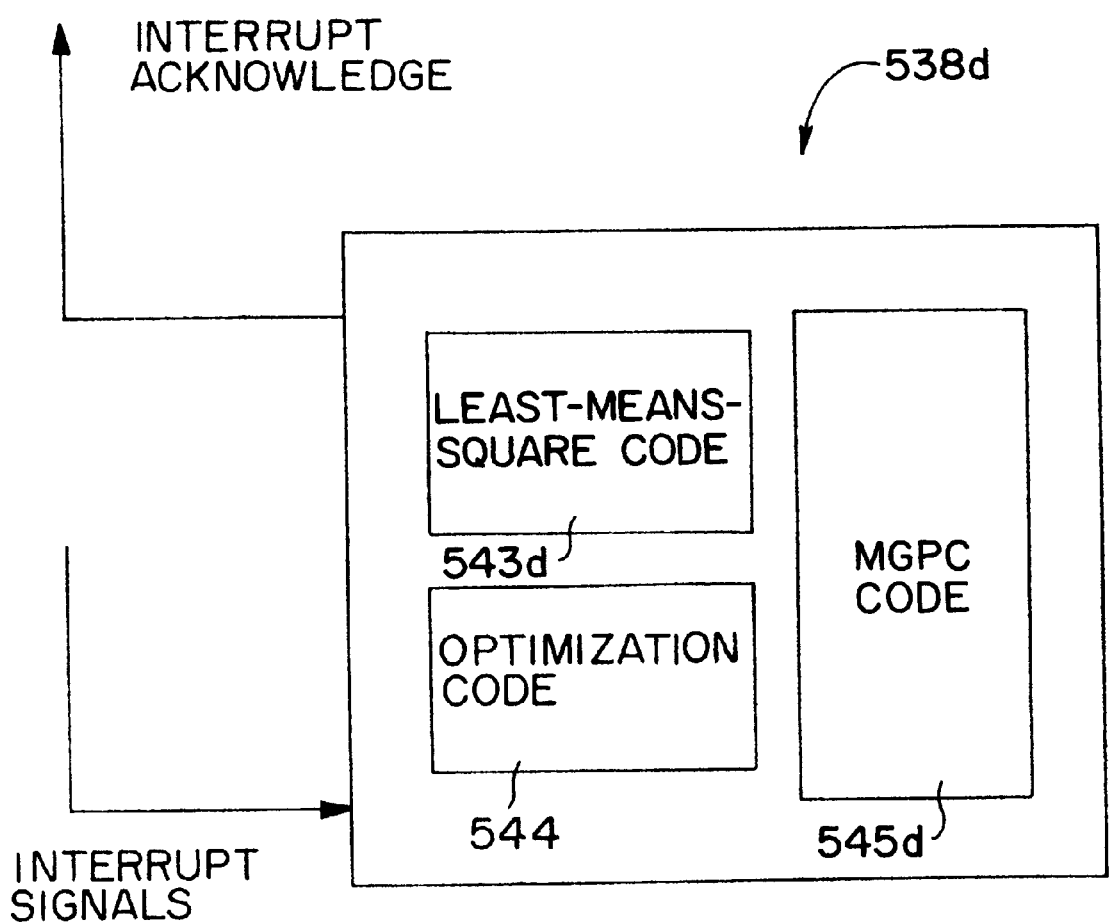
Figure 13E:
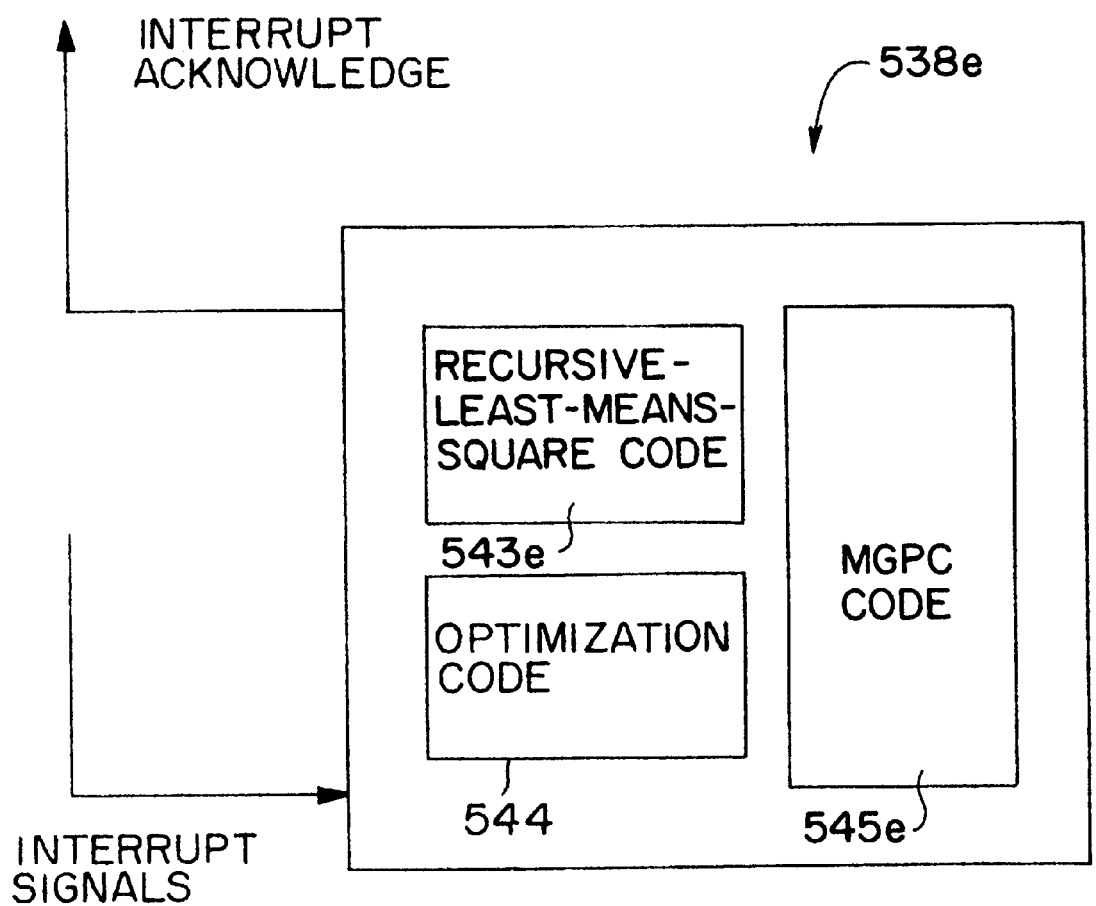
Figure 13F:
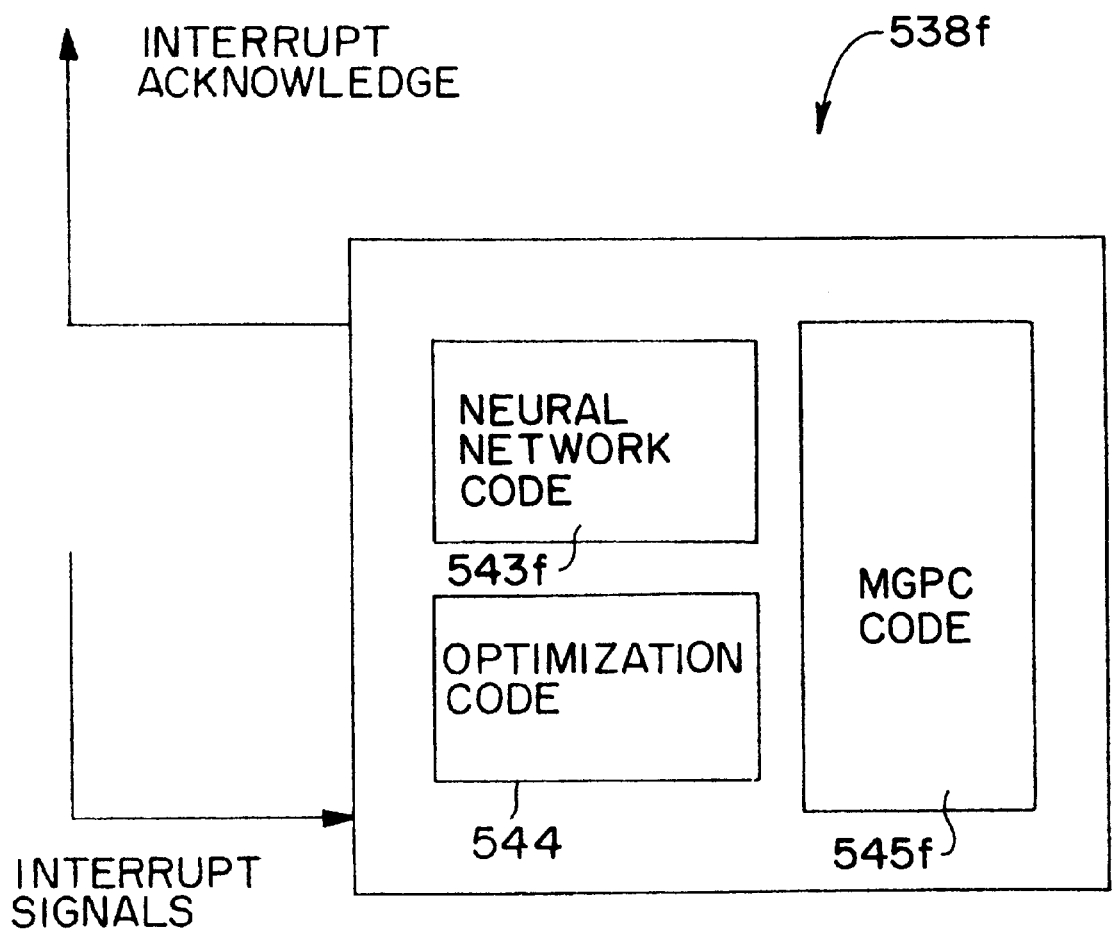

Depending on the system complexity, two possible system learning algoritms useful with the MGPC control code may be either a least-mean-squares (LMS) or recursive-least-mean-squares (RLMS) algorithm (FIGS. 13D and 13E). Equations for these computations are set forth as follows:

LMS: $\hat{\theta}(t) = \hat{\theta}(t-1) + 2\gamma[y(t) - \hat{y}(t)]$

RLMS: $\hat{\theta}(t) = \hat{\theta}(t-1) + K(t)[y(t) - \hat{y}(t)]$ $$K(t) = \frac{P(t-1)\Phi(t-1)}{\lambda + \Phi^T(t-1)P(t-1)\Phi(t-1)}$$

$P(t) = (1/\lambda)[I - K(t)\Phi^T(t-1)]P(t-1)$ where $\gamma$ is the identification gain ($0<\gamma<1$), $\lambda$ is the data forgetting factor, and I is an identity matrix. After some transient period, $\hat{\theta}(t)$ and $\hat{\theta}(t-1)$ become very close meaning the system has been identified, and the final values of $a_i$'s and $b_i$'s are stored.

A least-mean-squares algorithm (FIG. 13D) is typically used for low order systems, whereas the recursive-least-mean-squares (FIG. 13E) algorithm is typically used for higher order stable systems. A neural network system as described herein may be used for all types of systems adding intelligence to the system to guarantee numerical stability and unique solutions.

The optimal control code and the optimization codes 544, are part of the optimal—predictive control algorithm of the present embodiment. The optimal predictive control algorithm of the present invention is a modification of the generalized predictive control theory, in which that theory is made applicable to active vibration and noise control problems using both pseudo-feedforward and feedback signals.

Referring back to FIG. 5, the system 570, which is exposed to random and repetitive excitations as represented by the adder 505, and additionally to control inputs from the actuators 560 can be mathematically represented as:

$$A(Z^{-1})y(t) = B(Z^{-1})V(t-1) + D(Z^{-1})\gamma(t-1) + \frac{C(Z^{-1})}{\Delta}\xi(t)$$

where y(t) is the performance signal from the performance sensor 550, V(t) is the active control input from the actuator(s) 560, $\gamma(t)$ is the random+repetitive signal once they have gone through the $D(Z^{-1})/A(Z^{-1})$ filter to form the pseudo-feedforward measurement, $\xi(t)$ is the portion of the excitation that cannot be measured, and $\Delta$ is an integral control action forced on the control system to help eliminate the effects of the unmeasurable random excitation, $\xi(t)$.

The MGPC optimal control signal V(t), is derived based on minimization of the following cost function:

$$J = E\left\{\sum_{j=0}^{k}([y(t+j) - w(t+j)])^2 + \sum_{j=1}^{m}\Gamma_j[\Delta V(t+j-1)]^2\right\} \quad (11)$$

Namely, it is the function of the control signal sent to the actuators to keep the performance point's vibration (or noise level) as close as possible to a defined threshold w(t), while minimizing the total input effort, V(t). Furthermore, the parameter $\Gamma_j$ is used to develop a desired trade-off between the control effort V(t) and the resulting performance Y(t). In selecting $\Gamma$, one is able to use $1/V_{max}^2$, where $V_{max}$ is the maximum allowable control input. This aids in preventing the saturation of the actuator(s) 560.

By considering the Diophantine identity:

$$C(Z^{-1}) = E_j A\Delta + Z^{-j}F_j$$

The performance prediction ŷ(t) is given by:

$$\hat{y} = G\tilde{V} + f$$

where $$\tilde{V} = [\Delta V(t), \Delta V(t+1), \text{---}, \Delta V(t+n-1)]^T$$

where:

$$G = E_j B/C$$

$$f = E_j D\Delta\gamma(t+j-1)/C + F_j y(t)/C$$

$$\hat{y} = [y(t), y(t+1), \text{---}, y(t+k)]^T$$

k is the prediction horizon and the optimal control signal is $$\tilde{V} = (G^T G + \Gamma I)^{-1} G^T (w - f)$$

Note that $\tilde{V}$ provides the true minimum for the cost function because:

$$\partial^2 J/\partial \tilde{V}^2 = (G^T G + \Gamma^1 I)^T > 0$$

which guarantees asymptotic stability of the controlled system.

There are several design parameters that are selected to provide a fast and stable response, while satisfying the rate constraint of the control input, V(t). These parameters are the sampling rate, the prediction horizon for output (k) and for input (m), and the control penalty factor ($\Gamma$). In the preferred embodiment of the present invention, the sampling rate has been chosen to be 1/10th of the settling time. This provides for a reasonable trade off between accurate representation of the impulse response and the minimum computation time.

The output prediction horizon (k) is based on the physical location of the pseudo-feedforward sensor and the performance/feedback sensor. The selection of $\Gamma$ and m are correlated such that as m is raised, the control signal becomes more active. As $\Gamma$ is raised the control signal becomes less active. Thus m can be used to get close to the desired degree of control activity, whereas $\Gamma$ can be used for fine tuning. The controller 530 of the present embodiment of the invention uses the following rules to select m and $\gamma$.

(1) initially set m=$\Gamma$=o
(2) raise m until $\Delta V(t)$=rate constraint for 50% of the time
(3) raise $\Gamma$ until $\Delta V(t)$=rate constraint for 33% of the time.

For example, if the actuator is a shape memory alloy that can change its output (control force) at a rate of q lbf/sec, then first, m is increased until the actual and observed change of the output is 50% of q, that fixes the value of m. Then $\Gamma$ is raised until the observed changes are 33% of q. That determines the value of $\Gamma$. Thus there will be a short period of tuning of m and $\Gamma$ during the initial stage of the design. Thus the above rules are stored in the ROM section of the microprocessor and as the system changes with time, new values of $\Gamma$ and m are calculated automatically.

In summary, the present invention relates to a vibration control system which may include a system identifier (system learning code or device) and an optimal controller. There is described herein one particular system identifier which utilizes a neural network, which in one embodiment, is implemented using hardware. In another embodiment of the present invention, a neural network is implemented in software stored for use by a microprocessor or controller. The optimal controller utilized to process the outputs of the neural network was described in one particular embodiment as a Kalman filter algorithm stored in memory of a microprocessor or microcontroller. This is not meant to be limiting as other optimal controllers may be used with the neural network described herein.

Further, there is described herein an improved optimal controller which uses a modification of generalized predictive control (MGPC) to process inputs provided to it by a system identifier. In one particular embodiment the MGPC optimal controller was used to process inputs provided from a neural network, as described herein. In another embodiment, the MGPC optimal controller was used in connection with system learning code comprising a least-mean-squares computation. In yet another embodiment, the MGPC optimal controller was described as being used in connection with system learning code comprising a recursive least-mean-squares computation. This is not meant to be limiting, as other types of system learning codes or devices may be used in connection with the MGPC scheme described herein.

While the invention has been illustrate d and described in detail in the drawings and foregoing description, the same is to be considered as illustrative and not restrictive in character. While there are shown in the drawings individual sensors and actuators, it should be understood that this is a schematic representation which can reflect a larger number of sensors and actuators. It is desirable to have at least three actuators and three sensors associated with the systems of the present invention. It is more preferred to have systems, for example, six sensors and three actuators. Having more sensors and actuators allows for compensation of additional modes of movement including rotational and translational motion about three axes. It is being understood that only the preferred embodiment has been shown and described and that all changes and modifications that come within the spirit of the invention are desired to be protected.

What is claimed is:

1. An active vibration control system for controlling vibrations at a structure resulting from at least one excitation force acting upon the structure, comprising:

at least one actuator located at the structure for imparting a reaction force to the structure;

at least one sensor located away from said actuator, said at least one sensor producing a sensor output;

a controller connected between said at least one sensor and said at least one actuator, said controller including:

a system identifier for receiving said sensor output from said at least one sensor and deriving a relationship between said sensor output and said reaction force imparted to the structure by said at least one actuator; and an optimal controller connected to said system identifier to receive said relationship and for developing control driving signals from said relationship for driving said at least one actuator;

said system identifier including a Hopfield based neural net-work for learning the dynamics of the structure represented in a state space form and for providing output signals that follow state variables of the structure.

2. The active vibration control system of claim 1, said system including a plurality of sensors and wherein said neural network comprises a plurality of artificial neurons, each neuron receiving a weighted input from every other neuron and a feedback input from itself, as well as a weighted input biasing current related to the output of said at least one sensor, said neural network providing an output from each neuron to said optimal controller.

3. The active vibration control system of claim 2, wherein a plurality of sensors includes at least one performance sensor located at said structure for providing an output indicative of the vibration sensed at said structure.

4. The active vibration control system of claim 2, wherein said plurality of sensors additionally includes at least one pseudo-feedforward sensor located near the at least one excitation source, said psuedo-feedforward sensor being in a protected location.

5. The active vibration control system of claim 2, wherein each weighting of said weighted inputs to said neuron is different for at least some of said inputs.

6. The active vibration control system of claim 5, wherein said feedback input is also weighted.

7. The active vibration control system of claim 5, wherein said neural network is embodied in software.

8. The active vibration control apparatus of claim 5, including a plurality of actuators.

9. The active vibration control system of claim 5, wherein the output of each neuron j is $$v_j = g(u_j)$$

wherein:

$$u_j = \sum_{k=1}^{n} W_{jk} v_k$$

wherein g( ) is a nonlinear function, $W_{jk}$ is the weighting function for the connection between the jth and kth neuron, and $v_k$ is an input to the neuron.

10. The active vibration control system of claim 9, wherein the output of said neural network are at least a state matrix A, an input matrix B, and a state vector $\underline{X}$.

11. The active vibration control system of claim 10, wherein said optimal controller receives the state matrix A, the input matrix B and the state vector $\underline{X}$ from said neural network and uses Kalman filtering to derive said control driving signals for said at least one actuator.

12. The active vibration control system of claim 11, wherein said optimal controller minimizes the following cost function:

$$J = \frac{1}{2}\int_o^t [\underline{Y}^T P \underline{Y} + \underline{V}^T Q \underline{V}]dt$$

wherein P and Q are diagonal matrices that carry the terms $$\frac{1}{Y_{imax}^2}$$

and $$\frac{1}{V_{imax}^2}.$$

and, wherein said optimal controller additionally derives the optimal control input, $\underline{V}$, for said at least one actuator by solving:

$$\dot{R}+RA+A^TR+RBQ^{-1}B^TR-C^TPC=0$$

$$\underline{V}=-Q^{-1}B^TR\underline{X}.$$

13. The active vibration control system of claim 10, wherein said optimal controller receives the state matrix A, the input matrix B and the state vector $\underline{X}$ from said neural network and uses Modified Generalized Predictive Control to derive said control driving signals for said at least one actuator.

14. The active vibration control system of claim 13, wherein said optimal controller minimizes the following cost function:

$$J = E\left\{\sum_{j=0}^{k}([y(t+j)-w(t+j)])^2 + \sum_{j=1}^{m}\Gamma_j[\Delta V(t+j-1)]^2\right\}$$

where y(t) is the performance signal from the performance sensor, w(t) is a defined threshold, and V(t) is the input effort to said at least one actuator, $\Gamma_j$ is a parameter used to represent a desired trade-off between the control effort V(t) and the resulting performance Y(t).

15. A method for controlling vibrations at a structure resulting from at least one excitation force acting upon the structure, the structure being part of a vibration control system comprising at least one actuator located at the structure for imparting a reaction force to the structure, at least one sensor located away from the at least one actuator, the at least one sensor producing a sensor output, a controller connected between the at least one sensor and the at least one actuator, the controller including, a system identifier for receiving the output from the at least one sensor and deriving a relationship between the sensor output and the reaction force imparted to the structure by said at least one actuator and an optimal controller connected to the system identifier to receive the relationship and for developing control driving signals from the relationship for driving the at least one actuator, wherein the system identifier includes a Hopfield based neural network for learning the dynamics of the structure represented in a state space form and for providing output signals that follow state variables of the structure, comprising the steps of:

(a) using the neural network for learning system dynamics using input data from said at least one sensor and output characteristics, and for deriving A, B and C matrices; and state vector $\underline{X}$, wherein said A matrix is a state matrix, said B matrix is an input matrix and said C matrix is an output matrix, and X represents modal characteristic of the system;

(b) providing at least the A, B, and C matrices and state vector $\underline{X}$ to the optimal controller;

(c) using at least the A and B matrices and state vector $\underline{X}$ to calculate the optimal control signals; and (c) sending the resulting optimal control signals to the at least one actuator.

16. An active vibration control system for controlling vibrations at a structure resulting from at least one excitation force acting upon the structure, comprising:

at least one actuator located at the structure for imparting a reaction force to the structure;

at least one performance sensor located away from said actuator, said at least one performance sensor producing a performance output;

a psuedo-feedforward sensor producing a psuedo-feedforward output;

a controller connected between said sensors and said at least one actuator, said controller including:

a system identifier for receiving said performance and psuedo-feedforward outputs and deriving a relationship between said outputs and said reaction force imparted to the structure by said at least one actuator; and an optimal controller connected to said system identifier to receive said relationship and for developing control driving signals from said relationship for driving said at least one actuator;

said optimal controller using modified generalized predictive control incorporating actuator output limitations and output rate limitations in combination with the performance output and the pseudo-feedforward output to derive said control driving signals for said at least one actuator.

17. The active vibration control system of claim 16, wherein said optimal controller receives a state matrix A, an input matrix B and a state vector $\underline{X}$ from said system identifier.

18. The active vibration control system of claim 17, wherein said optimal controller minimizes the following cost function:

$$J = E\left\{\sum_{j=0}^{k}([y(t+j) - w(t+j)])^2 + \sum_{j=1}^{m}\Gamma_j[\Delta V(t+j-1)]^2\right\}$$

where y(t) is the performance signal from the performance sensor, w(t) is a defined threshold, and V(t) is the input effort to said at least one actuator, $\Gamma_j$ is a parameter used to represent a desired trade-off between the control effort V(t) and the resulting performance Y(t).

19. The active vibration control system of claim 18, wherein matrices A and B and state vector $\underline{X}$ are identified using a recursive method.

20. The active vibration control system of claim 19, wherein said recursive method is a least means square (LMS) determination.

21. The active vibration control system of claim 19, wherein said recursive method is a recursive least means square (RLMS) determination.

22. The active vibration control system of claim 19 wherein said system identifier includes a neural network for learning the dynamics of the structure and for providing output signals that follow state variables of the structure.

* * * * *